July 25, 1961 J. T. NEISWINTER 2,993,952

SYSTEM FOR TESTING SEQUENTIAL CODE SELECTOR

Original Filed Jan. 20, 1955 5 Sheets-Sheet 1

INVENTOR
J. T. NEISWINTER
BY John E. Cassidy
ATTORNEY

July 25, 1961 J. T. NEISWINTER 2,993,952

SYSTEM FOR TESTING SEQUENTIAL CODE SELECTOR

Original Filed Jan. 20, 1955 5 Sheets-Sheet 2

INVENTOR
J. T. NEISWINTER
BY
John E. Cassidy
ATTORNEY

July 25, 1961 J. T. NEISWINTER 2,993,952

SYSTEM FOR TESTING SEQUENTIAL CODE SELECTOR

Original Filed Jan. 20, 1955 5 Sheets-Sheet 3

INVENTOR
J. T. NEISWINTER

BY John E. Cassidy

ATTORNEY

SYSTEM FOR TESTING SEQUENTIAL CODE SELECTOR

Original Filed Jan. 20, 1955 5 Sheets-Sheet 4

INVENTOR
J. T. NEISWINTER
BY
John E. Cassidy
ATTORNEY

July 25, 1961 J. T. NEISWINTER 2,993,952

SYSTEM FOR TESTING SEQUENTIAL CODE SELECTOR

Original Filed Jan. 20, 1955 5 Sheets-Sheet 5

INVENTOR
J. T. NEISWINTER
BY John E. Cassidy
ATTORNEY

United States Patent Office 2,993,952

Patented July 25, 1961

2,993,952

SYSTEM FOR TESTING SEQUENTIAL CODE SELECTOR

James T. Neiswinter, Garden City, N.Y., assignor to American Telephone and Telegraph Company, New York, N.Y., a corporation of New York Original application Jan. 20, 1955, Ser. No. 482,983, now Patent No. 2,952,733, dated Sept. 13, 1960. Divided and this application Mar. 25, 1960, Ser. No. 17,594

8 Claims. (Cl. 178—4.1)

Figures 1, 6:
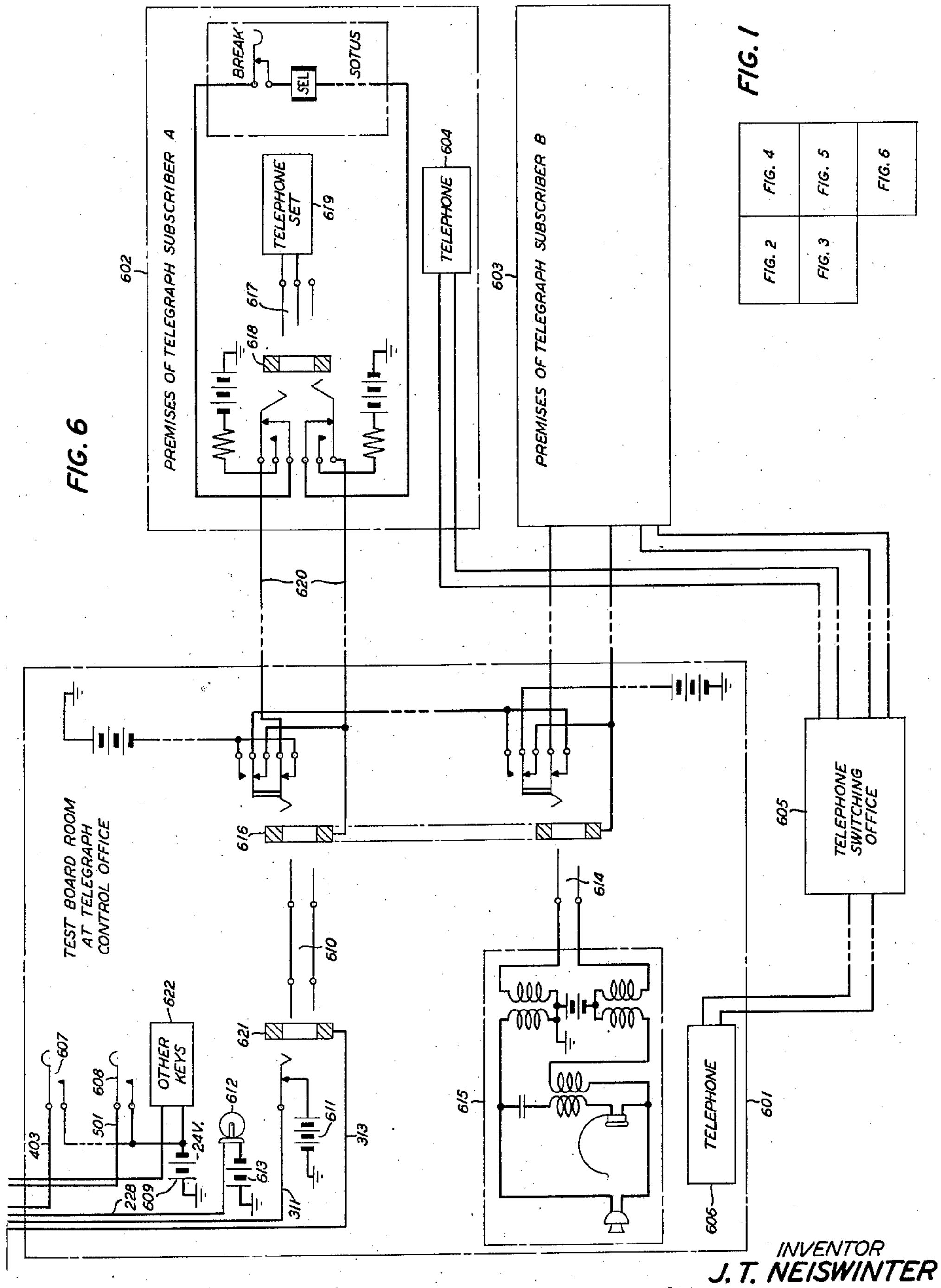

This application is a division of my application Serial No. 482,983, filed January 20, 1955, which issued as Patent No. 2,952,733 on September 13, 1960.

This invention relates to communication systems and particularly to telegraph communication systems including switching equipment for automatically directing and tranmitting messages from a station of origin to a station of destination through one or more switching centers in accordance with and under the control of directing or address character signals preceding the message and end-of-message signals following the message.

An automatic teletypewriter switching system of the type wherein the present invention may be adapted for use is found, for example, in Patent 2,766,318, issued October 9, 1956, to W. M. Bacon, G. J. Knandel, J. A. Krecek and G. A. Locke. The system comprises a telegraph central office, or switching center, and a plurality of line circuits respectively extending therefrom to a plurality of outlying main stations. In the Bacon et al. patent, supra, it becomes desirable to permit transmission from any of the outlying stations to the telegraph central office. Such transmission is automatically controlled from the central office by sending periodically therefrom groups of code signals identified as transmitter start patterns, the functions of which are to start transmission from the outlying stations in any predetermined sequence. The transmitters at the outlying stations are selected in their turn by single code combinations whereas the receivers, such as printers and reperforators, at such stations are selectively connected to the line circuits for receiving messages from the central office by address codes comprising a sequence of two code combinations. These address or directing codes are referred to herein as receiver cut-on codes.

To accomplish selection of a desired station, a selector equipped with means capable of responding to a transmitter start pattern and a receiver cut-on pattern is provided at outlying stations. This type of selector is identified as a Sequentially Operated Teletypewriter Universal Selector, or what is generally known as a "SOTUS" unit shown and described in the Bacon et al. patent, supra. It is provided with contacts that are respectively responsive to the single and two code signal combinations for performing the necessary switching of the transmitter and receiver into operative connection with its respective line circuit. A "SOTUS" unit is located at each outlying station and is always connected to the line circuit, and monitors all traffic passing over such circuit. The disclosure of the Bacon et al. patent, supra, is therefore incorporated herein, by reference, as part of the present specification.

An object of the invention is to automatically produce at a telegraph central office and to automatically transmit over any one of a plurality of line circuits extending from the central office to the respective station a distinctive series of test signals for checking the operation of the "SOTUS" unit at such station in response to a single request of a maintenance man thereat made at the start of operations.

Another object is to eliminate the services of an attendant at the testboard in the telegraph central office during the time that the maintenance man at an outlying station is checking the "SOTUS" unit at such station.

Heretofore, the source of teletypewriter test signals used for testing machines at outlying stations has been separate strips of perforated teletypewriter tape for each machine and for each type of test signals required for such machine. This tape method has been unsatisfactory due to the work required to prepare the tape with the necessary signal code perforations and the difficulties in storing and maintaining a large number of such prepared tapes in a test room. Another objection to the use of a tape is that the services of a testboard attendant to substitute tapes is required very frequently by the maintenance man during the testing operations.

A feature of the invention is the provision at a central office of means residing in a coordinate array of connecting points having a plurality of abscissas and a plurality of ordinates whereby each abscissa is capable of producing a plurality of distinctive permutation code signals arranged to be automatically selected and transmitted to any one of a plurality of outlying stations, as desired, in response to a request from such one of the outlying stations.

Another feature is the provision of means at a central office responsive to one or more "break" signals received from any one of a plurality of outlying stations for selecting certain desired groups of the permutation code signals and for automatically transmitting each signal of such certain groups, in turn, to that one of the outlying stations. For example, in response to one "break" signal, the transmitter start pattern of permutation code signals for such one station is selected and automatically transmitted; in response to two "break" signals, the receiver, or printer, cut-on pattern is selected and automatically transmitted; in response of four "break" signals, permutation code signals for letters "R" and "Y' 'are automatically transmitted alternately, each of the "R" and "Y" signals having switched bias; and in response to five "break" signals or one "break" signal following the four "break" signals which were transmitted for the "R" and "Y" switched bias signals, permutation code signals for letters "R" and "Y" are automatically transmitted alternately, each of the "R" and "Y" signals having switched end distortion.

Still another feature is the provision of means at a central office responsive to three "break" signals from any one of a plurality of outlying stations for operating a signal at a testboard at the central office indicating to the testboard attendant that a telephonic connection is desired between the testboard and that outlying station.

Another feature is the provision of means at a central office, including an electronic timing circuit for restoring the "break" signal responsive means to its normal position should no additional "break" signals be received within an interval of predetermined duration. With this provision the maintenance man at an outlying station knows at all times what kind of test signals he has elected to receive from the central office inasmuch as the selector switch brushes are returned to normal in response to one or more "break" signals transmitted from the outlying station during the time that test signals are being transmitted to the outlying station in response to a previous request.

Another feature is the provision of means at a central office, responsive to one or more incoming "break" signals and having a plurality of rotatably stepping members arranged to simultaneously operate through one step for each permutation code signal automatically transmitted to an outlying station, the stepping operation being successively performed through an angular distance of almost 360 degrees and then repeated until another "break" is received.

The present system includes means at a central office, having a single rotatably stepping member arranged to operate through one step each time that the means having the plurality of rotatably stepping members operate through an angular distance of almost 360 degrees, whereby different groups of permutation code signals are selected for automatic transmission to an outlying station.

The present system includes also means operative in response to the stop pulse of each of the permutation code signals automatically transmitted to the outlying station when the selecting means responsive to the "break" signals has been conditioned in response to the four or five "break" signals for automatically transmitting the permutation code signals for the letters "R" and "Y" alternately to an outlying station.

Figure 2:
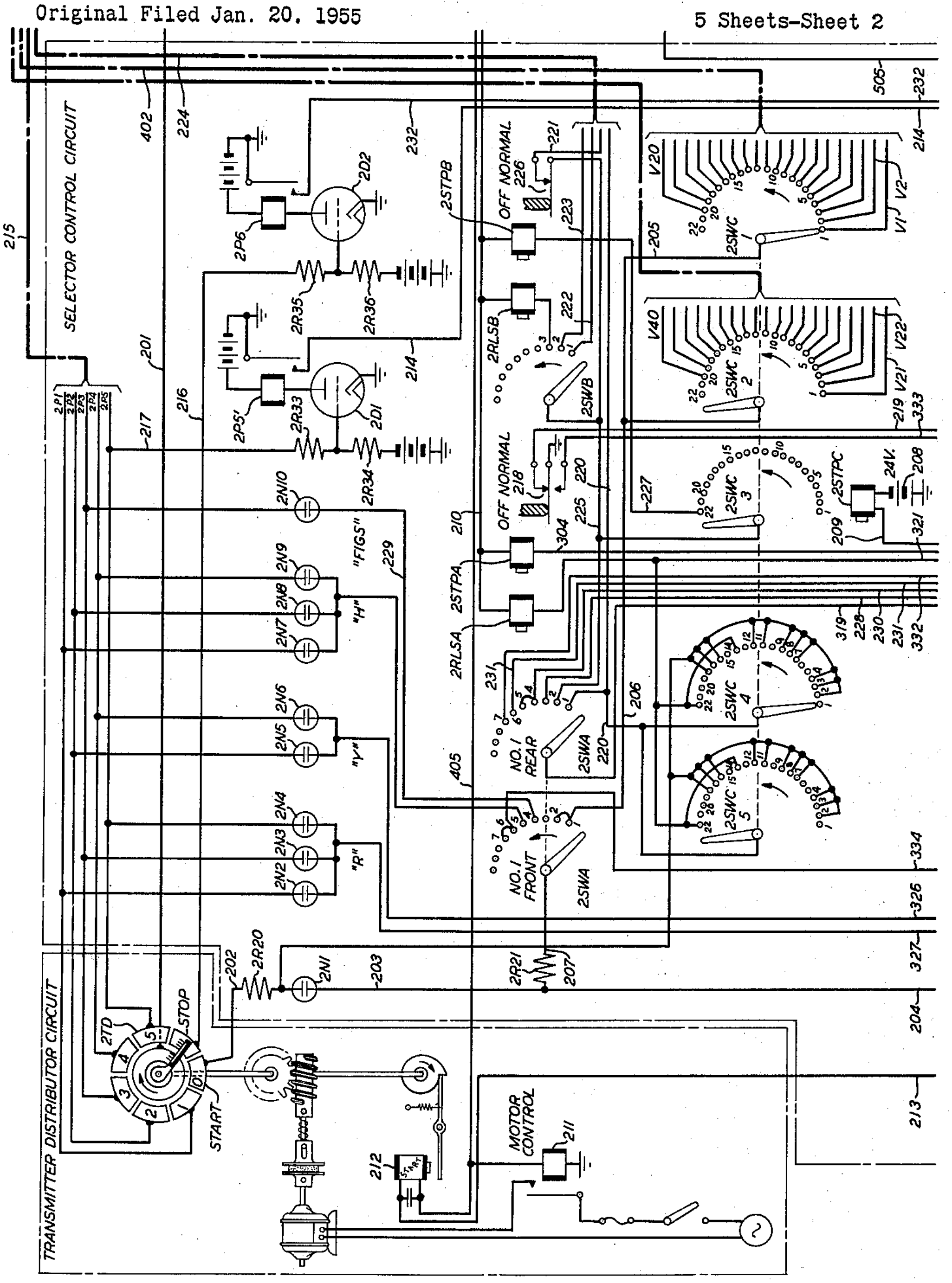
Figure 3:
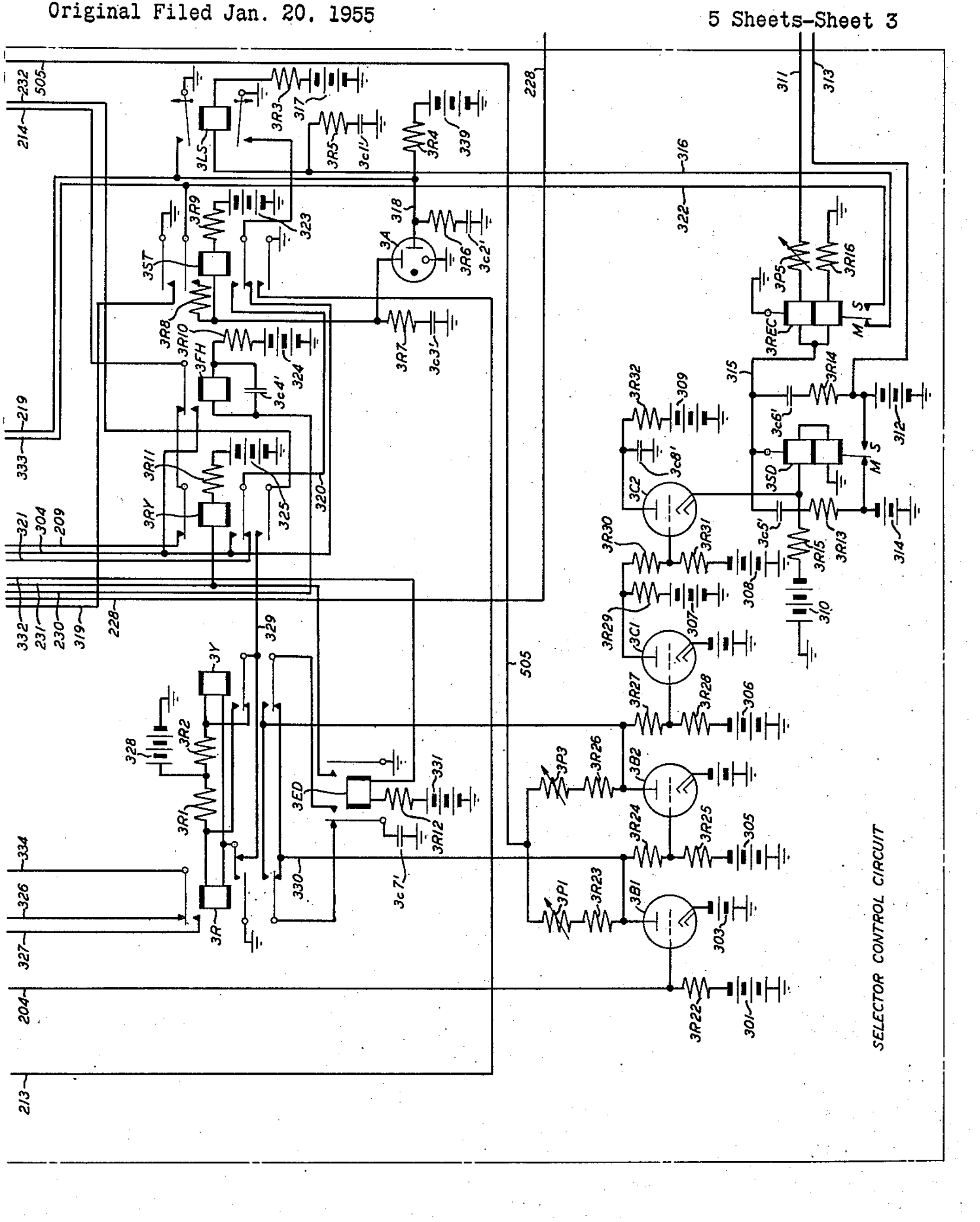
Figure 4:
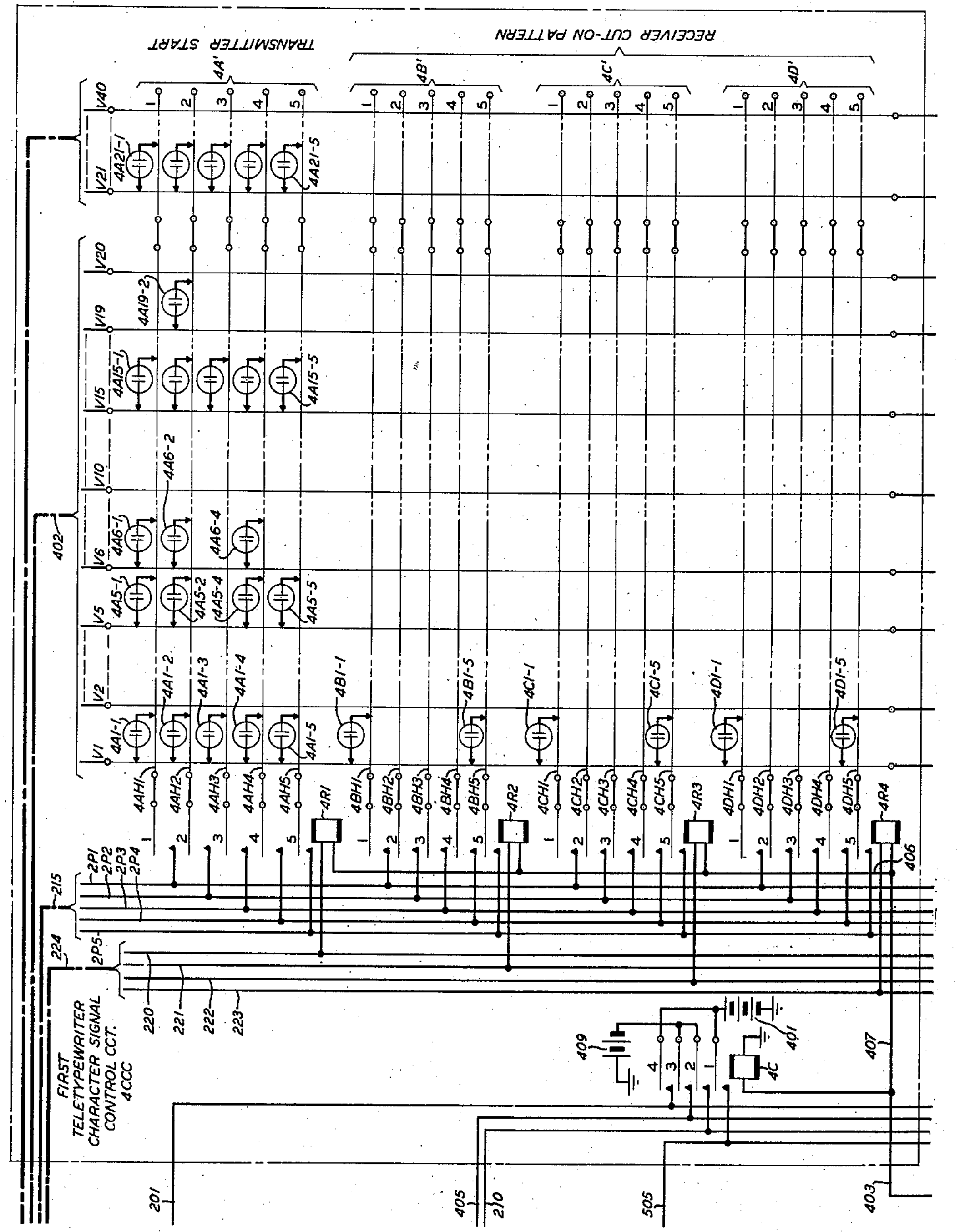
Figure 5:
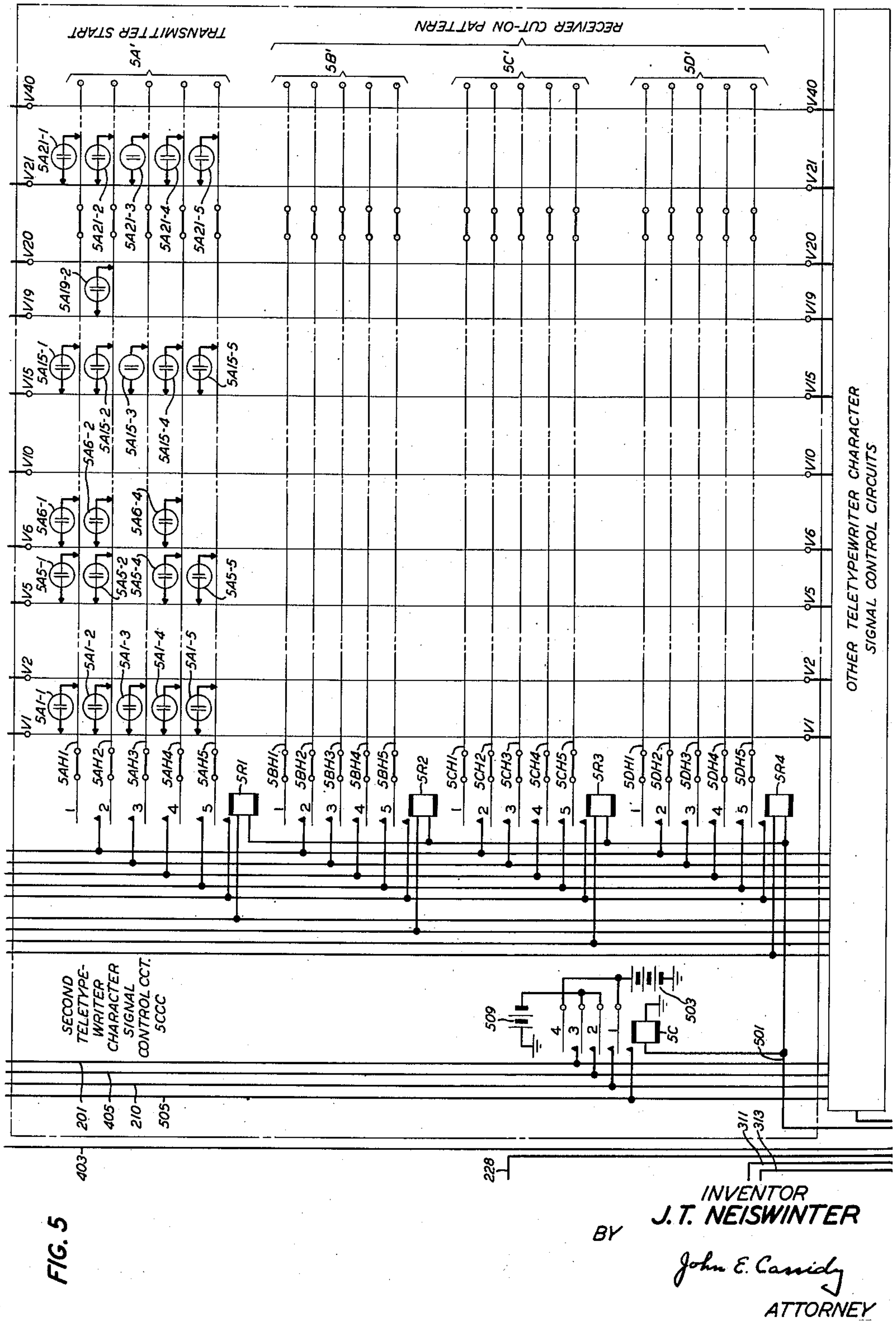

The foregoing objects and features of this invention may be more readily understood by the following description when read in reference to the drawings of which:

FIG. 1 shows the relative arrangement of FIGS. 2 to 6;

FIGS. 2 to 5 and the left-hand portion of FIG. 6 show the equipment at the telegraph central office or switching center, and the right-hand portion of FIG. 6 shows in block form two main stations whereat the "SOTUS" unit at each is adapted for connection to the telegraph central office for receiving the test signals produced thereat;

FIG. 2 shows in the extreme left-hand portion the transmitter-distributor circuit used for sending to the line circuit teletypewriter test signals;

FIG. 2 in the remaining portion and FIG. 3 show the selector control circuit responsive to the "break" signals incoming over a line circuit of an outlying station for selecting the desired test signals automatically produced at the telegraph central office, and for directing such desired test signals to the line circuit of such outlying station;

FIGS. 4 and 5 show the teletypewriter character signal control circuits for automatically producing the desired test signals upon request from the maintenance man at any one of the outlying stations;

FIG. 6 shows (1) in the left-hand portion, in skeletal form, the equipment in the test room at the central telegraph office, (2) in the lower portion, in block form, a telegraph central office which forms a part of the regular telephone commercial system, and (3) in the right-hand portion, two outlying stations of a plurality whereat the "SOTUS" units are arranged to receive the desired test signals from their respective teletypewriter character signal control circuits.

It is to be understood that the equipment shown in FIGS. 2 to 5, inclusive, represents an embodiment of the present invention.

The invention provides automatically operated and controlled means for permitting a maintenance man at an outlying main station to test the "SOTUS" unit at such station with teletypewriter test signals automatically produced at the telegraph central office without the aid of a testboard attendant other than to have such attendant establish the original connection and effect the necessary disconnection when the tests are completed. The "SOTUS" unit may be of the type disclosed in Patent 2,502,654, granted April 4, 1950, to G. S. Keys, and Patent 2,568,264, granted September 18, 1951, to W. J. Zenner.

GENERAL DESCRIPTION

The use of reference characters on the drawings follows a definite plan. In FIGS. 2 to 5, inclusive, all apparatus shown have reference character designations consisting of numerals and letters, the first digit of each reference designation corresponding to the number of the figure in which the apparatus so designated is located. All other parts of the system including both apparatus and interconnecting conductors are designated with numerals whereof the first or hundreds digit designates the figure in which the particular part is located.

The equipment provided at the telegraph central office comprises a plurality of teletypewriter character signal controlled circuits, one for each outlying main station, wherein the teletypewriter test signals are automatically produced; a selector control circuit automatically responsive to request of a maintenance man at an outlying station for selecting any desired teletypewriter test signals to be produced by the particular teletypewriter character control circuit assigned to that station; a transmitter-distributor circuit for transmitting to the outlying station the desired signals requested by the maintenance man; and a testboard whereat an attendant in response to a telephonic request from a maintenance man, may establish a connection between a desired teletypewriter character signal control circuit and the calling line circuit. The teletypewriter character signal control circuits are individual to the line circuits terminating at the central office.

*Teletypewriter character signal control circuit*

A teletypewriter character signal control circuit is provided for each of the outlying stations of the system. Each of these circuits automatically produces a succession of teletypewriter character signals without the use of a perforated teletypewriter tape. Each teletypewriter character signal is determined by the connection of a group of from one to five small neon lamps to their respective code segments of a transmitter-distributor, one lamp being required for each "spacing" element in a teletypewriter character signal. This circuit is intended primarily for use in producing the necessary teletypewriter character signals required to test a "SOTUS" unit at an outlying station in the system disclosed in the Bacon et al. patent, supra.

The neon lamps used are provided in horizontal rows of lamp sockets, the lamp sockets being of the regular switchboard type. A bank of five rows of sockets, each row containing forty sockets, provides for the production of forty teletypewriter character signals, each vertical row of five sockets in the bank being assigned for a teletypewriter character signal. The first or uppermost lamp socket of a vertical row of five corresponds to the first selecting element or pulse of a character signal, the second socket with selecting pulse No. 2, and so on. The teletypewriter character signal is determined by inserting a neon lamp in each socket associated with a selecting pulse that is to be a "spacing" element of the signal. The absence of a lamp in a socket causes the corresponding pulse to be a "marking" element.

Four forty-character signal lamp socket banks, as described above, are provided for testing a "SOTUS" unit at each outlying station to be served in the system disclosed in the Bacon et al. patent, supra. An attendant at the testboard in the telegraph central office, in response to a telephonic request from a maintenance man at an outlying station, operates a key whereby the bank of lamp sockets assigned to the calling station is selected for connection to the line circuit to which the "SOTUS" unit at the calling station is connected, one key being provided for the "SOTUS" unit at each of the outlying stations.

The first or uppermost bank of lamp sockets of each group of four banks is used to provide a transmitter start pattern of signal combinations for testing the "SOTUS" unit at a calling station while the lower three banks are used to provide the calling station teletypewriter printer or receiver cut-on pattern. A sequence of forty-character signals is thus available for the transmitter start patterns and 120-character signals for the receiver cut-on patterns.

The teletypewriter character signal control circuit also provides alternate "R" and "Y" signals, with either 20 percent switched bias or 20 percent switched end distortion.

Reference herein to the teletypewriter character signal control circuits is had by designating the circuit shown in FIG. 4 as circuit 4CCC with its lamp socket banks designated, from top down, 4A′, 4B′, 4C′ and 4D′, respectively, and that in FIG. 5 as circuit 5CCC with its lamp socket banks accordingly designated 5A′, 5B′, 5C′ and 5D′, respectively. The lamp sockets themselves are designated with combinations of numerals and letters according to the banks in which they are located and the intersections at which the coordinate verticals and horizontal conductors may be respectively interconnected by means of the sockets to form energizing circuits for the neon lamps that may be inserted in such sockets for transmitting a "spacing" pulse when desired as part of a five-unit code signal, the last character of each reference designation indicating the element of elements Nos. 1 to 5 of the code signal. The vertical conductors are designated V1 to V40 representing the forty-character signals and extend through all the teletypewriter character signal control circuits 4CCC, 5CCC, etc., of the system. The horizontal conductors are arranged in four groups of five each and are designated according to the banks wherein they form with the vertical conductors the points of intersection for the lamp sockets. The horizontal conductors for bank 4A′ are designated 4AH1 to 4AH5, respectively; for bank 4B′, 4BH1 to 4BH5, respectively; and so on for each of banks 4C′ and 4D′. The horizontal conductors of banks 5A′ are designated 5AH1 to 5AH5, respectively, for banks 5B′, 5BH1 to 5BH5, respectively; and so on for each of banks 5C′ and 5D′. The lamps disposed in sockets at the conductor intersections in bank 4A′ are designated at vertical conductor V1 as 4A1–1 to 4A1–5, respectively; at vertical conductor V5, as 4A5–1 to 4A5–5, respectively; at vertical conductor V21, as 4A21–1 to 4A21–5, respectively. Those at the conductor intersections in bank 4B′ at vertical conductor V1 are designated 4B1–1 to 4B1–5, respectively; and those in bank 5A′ at vertical conductor V1 are designated 5A1–1 to 5A1–5, respectively, and so on.

Each bank of lamp sockets is selectively associated with the transmitting apparatus by a relay, and four such relays for each teletypewriter character signal control circuit are selectively prepared for operation by operating a manually operable key, such as any one of keys 607, 608, etc., at the testboard, one key being provided for each of the teletypewriter character signal control circuits 4CCC, 5CCC, etc. The relays for banks 4A′, 4B′, 4C′ and 4D′ are respectively designated 4R1, 4R2, 4R3 and 4R4. Each group of bank relays, such as 4R1, 4R2, 4R3 and 4R4, is controlled by a common relay, such as relay 4C for the teletypewriter character signal control circuit 4CCC shown in FIG. 4 and bank relays 5R1, 5R2, 5R3 and 5R4 of teletypewriter character signal control circuit 5CCC are controlled by common relay 5C. Relays 4C, 5C, etc., are controlled by the testboard keys 607, 608, etc., individual to the signal control circuits 4CCC, 5CCC, etc. The bank relays, such as relays 4R1 to 4R4 and 5R1 to 5R5 are selected for operation over contacts of selector switches 2SWA and 2SWB which are responsive to "break" signals incoming over a line circuit from any one of the outlying stations, as will be hereinafter described.

The plurality of signal control circuits 4CCC, 5CCC, etc. are under control of the selector control circuit which will be hereinafter described to show how the maintenance man at an outlying station may call, by means of "break" signals, independently of the services of a testboard attendant, for any test signals that he may desire from the signal control circuit assigned to his station, and in response to those "break" signals the signal control circuit assigned to the calling station immediately transmits through a rotary distributor to the "SOTUS" unit at the calling station the particular signals requested, such as any of those signals which constitute the following: The transmitter start pattern, the receiver cut-on pattern, the receiver disconnect pattern, the alternate "R" and "Y" signals with 20 percent switched bias or with 20 percent switched end distortion. This is done by the maintenance man sending "break" signals over the line circuit, one "break" signal causing the desired signal control circuit to produce and send the transmitter start pattern; two "break" signals, the receiver cut-on patterns; four "break" signals, the receiver disconnect pattern ("Figures" and "H") followed by the alternate "R" and "Y" signals with 20 percent switched bias and one additional "break" signal at this time changing 20 percent switched bias in the alternate "R" and "Y" signals to 20 percent switched end distortion. At any time that test signals are being transmitted to the line circuit, except when such signals are the alternate "R" and "Y" signals with switched bias, one "break" signal sent by the maintenance man will stop transmission. The system requires that means be provided at the outlying station for the maintenance man to "break" on the line circuit for telephonic communication with the testboard attendant and therefore a telephone handset is provided at the outlying station so that when the testboard attendant is signaled he can connect his telephone headset to the line circuit in order to talk with the maintenance man. To establish this telephonic connection, the maintenance man sends three "break" signals to cause signal lamp 612 at the testboard to light and then plugs the station handset 619 into jack 618 of the line circuit. The attendant upon observing the lighted lamp, removes the right-hand plug of patching cord 610 from jack 616 and substitutes plug 614 of his headset 615 whereby a telephonic connection is established between headset 615 and handset 619.

*The selector control circuit*

The selector control circuit which is common to all the signal control circuits 4CCC, 5CCC, etc., as hereinbefore stated, comprises three rotary switches, the relays necessary to step the rotatable brushes of such switches in response to the "break" signals received from the line circuit, the relays and the space discharge tubes for producing the "Figures," "H," "R" and "Y" signals and for creating the 20 percent switched bias and switched end distortion in the "R" and "Y" signals. The rotary switches 2SWA and 2SWB are of the selector type and are responsive to the "break" signals transmitted from the outlying station for selecting the desired transmitter start and the receiver cut-on patterns from those produced in the signal control circuits. Rotary switch 2SWC is of the stepping type and serves to direct the selected transmitter start and receiver cut-on patterns back over the line circuit to the "SOTUS" unit at an outlying station. Switch 2SWA has two banks of ten contacts each. Stepping switch 2SWC has five banks of twenty-two contacts each and selector switch 2SWB, which has one bank only of ten contacts, is operable one step each time the brush on bank No. 3 of stepping switch 2SWC rotates to engage its contact No. 22. The contacts of switches 2SWA and 2SWB serve to select for operation the bank control relays 4R1 to 4R5, 5R1 to 5R5, etc., and the contacts of banks Nos. 1 and 2 of switch 2SWC serve to close energizing circuits extending through the lamps in the sockets in the forty vertical conductors which extend through all the signal control circuits 4CCC, 5CCC, etc.

GENERAL THEORY OF OPERATION

*Creation of a single character signal*

Transmitter-distributor 2TD has a source of positive potential of 130 volts, such as one of sources 401, 503, etc., in any of the signal control circuits 4CCC, 5CCC, etc., connectable to its inner ring in a circuit traceable over conductor 201, front contact and outermost upper armature 4 of a relay controlling the operation of the selected signal control circuit, such as relay 4C of the circuit 4CCC. The start segment of distributor 2TD is connected in a path extending over conductor 202, resistor 2R20, neon lamp 2N1, conductors 203 and 204, to the grid of vaccum tube 3B1. Vacuum tube 3B1 is normally non-conducting due to a source 301 of grounded negative potential of 130 volts being connected directly to its grid through resistor 3R22 of high resistance value. When the distributor brush of distributor 2TD starts rotating over the start segment at a time when relay 4C is in operated condition, assuming that its respectively associated locking key 607 is operated at a telephonic request from the outlying station to which signal control circuit 4CCC is assigned, the positive source 401 of potential is connected in a circuit extending over conductor 201 to the start segment to cause neon lamp 2N1 to fire and the positive voltage of 130 volts overrides the negative voltage of 130 volts through the high resistance of resistor 3R22, to make the vacuum tube 3B1 conducting. Vacuum tube 3B1 is the first of four tubes connected in cascade, the three other vacuum tubes being designated 3B2, 3C1 and 3C2. Vacuum tubes 3B2 and 3C2 are normally conducting and vacuum tube 3C1, like vacuum tube 3B1, is normally non-conducting. Vacuum tube 3C2, being normally conducting, normally supplies marking current through its cathode to the winding of send relay 3SD. Relay 3SD transmits all signals repeated by vacuum tube 3C2 to conductors 311 and 313 which are adapted for connection to any of the line circuits. Therefore, when vacuum tube 3B1 is made conducting by the distributor brush passing over the start segment which always sends a "spacing" pulse, the last tube, namely tube 3C2, is made non-conducting, and reverse current in the path extending from grounded source 310 of negative potential of 130 volts, resistor 3R15 and the windings of relay 3SD operates the relay to its spacing or right-hand contact thereby transmitting a "spacing" pulse to the connected line circuit. The four tubes 3B1, 3B2, 3C1 and 3C2, being arranged in cascade, are used to permit adding switched bias or switched end distortion to the signals as will be described hereinafter.

If the first code or selecting pulse of the character signal transmitted from the selected signal control circuit is a "spacing" element, a connection is made traceable from code segment No. 1, over conductor 2P1 included in dot and dash line 215 representing the five conductors 2P1 to 2P5, front contact and armature No. 1 of an operated relay, such as relay 4R1, assuming that key 607 at the testboard is in its operated position, and a neon lamp 4A1–1, vertical conductor V1 of the signal control circuit 4CCC which is one of twenty conductors represented by dot and dash line 402, rotatable brush on the corresponding contact, such as contact No. 1 of bank No. 1 of switch 2SWC, conductors 205 and 206, contact No. 1 or 2 and rotatable brush of the front bank of selector switch 2SWA, conductor 207, resistor 2R21, conductor 204 to the grid of vacuum tube 3B1. Thus when the brush of distributor 2TD passes over segment No. 1, source 401 of positive potential of 130 volts will again be connected to the grid of vacuum tube 3B1, making tube 3B1 conducting and tube 3C2 non-conducting, to operate relay 3SD to its right-hand or spacing contact.

For each of the following code pulses that is to be "spacing," a connection is made through the proper code segment of distributor 2TD and one of the neon lamps 4A1–2, 4A1–3, 4A1–4 and 4A1–5 to the grid of vacuum tube 3B1 so that when the rotatable brush passes over the segment the positive potential at source 401 will be momentarily impressed on the grid of tube 3B1. If a code pulse is to be "marking," no connection is made from the particular code segment inasmuch as there is no neon lamp in the socket at the corresponding intersection of the horizontal and vertical conductors, such as conductor 4AH–2 and vertical conductor V1. When the rotatable brush passes over a selecting code segment corresponding to a "marking" element of a character signal, there will be no source of positive potential connected to the grid of tube 3B1 and the negative voltage of source 301 applied through resistor 3R22 of high resistance value to the grid of tube 3B1 will, therefore, cause the tube to become non-conducting and consequently tube 3C2 will become conducting to operate relay 3SD to its left-hand or marking contact. Relay 3SD, upon operating to its marking contact, transmits a "marking" pulse to the line circuit.

For the "stop" pulse or element of the character signal, no connection is made from the "stop" segment of distributor 2TD to the grid of vacuum tube 3B1 and, accordingly, this pulse will always be a "marking" element.

With the arrangement just described, the continuous operation of the distributor will cause the character signal established by the connections of the neon lamps in the sockets of the signal control circuit 4CCC to be repeated continuously. To permit a sequence of different character signals to be sent, relay 2P5′ is operated through the conduction of vacuum tube 2D1 by the fifth code pulse transmitted in a circuit traceable from grounded source 401 of positive potential of 130 volts, armature No. 4 and front contact of relay 4C, conductor 201, inner ring and segment No. 5 of the distributor 2TD, conductors 2P5 and 217, resistor 2R33 to the grid of vacuum tube 2D1. Vacuum tube 2D1, upon conducting, operates relay 2P5′. Relay 2P5′, upon operating, closes a circuit extending from grounded source 208 of negative potential of 24 volts, through the winding of stepping magnet 2STPC, conductor 209, back contact and upper armature of relay 3RY, back contact and upper armature of relay 3FH, conductor 214, to ground at the front contact and armature of relay 2P5′ and stepping magnet 2STPC operates to step selector switch 2SWC one step during the "stop" pulse of each character signal.

The grid of vacuum tube 3B1 is connectable through the brushes of banks Nos. 1 and 2 of rotary switch 2SWC to the vertical conductors V1 to V40. A different group or combination of from zero to five neon lamps may be inserted in the five sockets on each of vertical conductors V1 to V40 for each bank of a selected one of the signal control circuits. Each of these combinations, in turn, is connectable through relay contacts to the code segments of distributor 2TD. Thus the character signal for each step of the rotary switch 2SWC is determined according to which sockets of the five of a group on a vertical conductor within a bank are occupied by neon lamps. As hereinbefore stated, the start segment of distributor 2TD is always connected directly through a neon lamp 2N1 to the grid of vacuum tube 3B1 and the stop segment has no connection to the vacuum tube 3B1. Therefore, the start pulse of the character signal will always be a "spacing" element and the stop pulse will always be a "marking" element. If a contact in either of banks Nos. 1 and 2 of rotary switch 2SWC has no connection through any neon lamps in the signal control circuit to the segments of distributor 2TD, all five code pulses of the character will be "marking" and the "Letters" signal will be transmitted to the line circuit. If a contact in bank No. 1 or 2 is connected through neon lamps to all five code segments of distributor 2TD, all five selecting pulses will be "spacing" elements and the "blank" signal will be transmitted to the line circuit.

*Reason for using neon lamps*

When a large number of teletypewriter character signals are to be sent in sequence, necessitating using a rotary selector switch having many contacts or a rotary selector switch with several rows or banks of contacts arranged by means of relays for the rows to be connected in sequence, a large number of alternate so-called "sneak" paths exists between the distributor segments and the contacts of the rotary selector switch. If resistors or even varistors were used in place of neon lamps in the connections between the distributor segments and the steps of the rotary selector switches, the combined parallel resistance of so many paths would be so low as to make the circuit unworkable.

With the use of neon lamps in these paths in the signal control circuit, the voltage across the direct path extending from, say, source 401 of positive potential of 130 volts, armature No. 4 and front contact of relay 4C, conductor 201, continuous ring and any one segment of distributor 2TD through the corresponding front contact and armature of an R relay, such as relay 4R1, the neon lamp disposed in the socket connected between that armature and one of the vertical conductors V1 to V40 included in dot and dash line 402, contact on either of banks Nos. 1 or 2 of stepping switch 2SWC, conductor 206, contact and brush of the front bank of selector switch 2SWA, conductor 207, resistor 2R21, conductor 204, the grid and cathode of tube 3B1, to source 303 of negative potential of 24 volts wherein a total of 154 volts is had. A voltage of 90 volts is sufficient to cause the neon lamp in the direct path to fire. Each of the alternate paths involves three neon lamps in tandem, however, and the total voltage used in the system is insufficient to fire this number of lamps in tandem. The result is that all alternate parallel paths are completely open and thus an unlimited number of teletypewriter character signals can be produced with no effect whatever due to parallel path currents.

*Remote control by means of "break" signals*

The various types of teletypewriter character signals produced by a signal control circuit can be selected in response to "break" signals received from the line circuit. The teletypewriter character test signals are transmitted, in return, to the outlying station from which the "break" signals were received. These "break" signals normally will be transmitted by a maintenance man at the outlying station. Each "break" signal transmitted over the line circuit operates selector switch 2SAW in a circuit traceable from ground at the lower armature and back contact of normally operated relay 3LS (assumed to be released by the break signal), inner lower armature and back contact of relay 3ST, conductor 304, through the winding of stepping magnet 2STPA, conductor 210, front contact and armature No. 2 of a C relay, such as relay 4C, to grounded source of negative potential of 24 volts, such as source 409. At the end of each "break" signal, a timing circuit begins to function which, at the end of about three seconds, will operate a relay which will start the transmission of the teletypewriter character test signals. If less than three seconds occur between "break" signals, the timing circuit is restored to its normal position. Thus for a succession of "break" signals with less than three seconds between each "break," selector switch 2SWA will continue to step. Three seconds after the last "break" signal, the timing circuit will operate the R relay, such as relay 4R1, which starts the particular teletypewriting character test signal associated with the particular contact with which the brush of stepping switch 2SWC is engaged.

After the R relay has operated to start the transmission of the teletypewriter character test signals, any subsequent "break" signal will cause the brush of the selector switch 2SWA to return to its zero or normal position, stopping the transmission of teletypewriter character test signals. The circuit which operates on the "break" signals is timed so that the normal "spacing" intervals present in teletypewriter character signals do not operate it.

*Production of "Figures" and "H" signals, followed by "RY" signals with biased or end distortion*

When four "break" signals are received from the line circuit, selector switch 2SWA is operated to contacts Nos. 4 of both its front and rear banks and contacts Nos. 4 are so connected that the "Figures" signal is transmitted back over the line circuit. At the end of the "Figures"

signal, the selector switch brush is automatically stepped to contacts Nos. 5, and contacts Nos. 5 are connected so that the signal for the letter "H" is transmitted to the line circuit. At the end of the "H" signal, the selector switch brushes are automatically stepped to their contacts Nos. 6, and contacts Nos. 6 are connected through a two-relay stepping circuit which alternates its condition at the end of each teletypewriter character signal. The alternations are effected by the upper armature of relay 3R which, when in its operated condition, causes the signal for the letter "R" to be transmitted, and in its unoperated condition, causes the signal corresponding to the letter "Y" to be transmitted. The signal corresponding to the letter "R" is transmitted with 20 percent marking bias and the signal corresponding to the letter "Y" is transmitted with 20 percent spacing bias, giving the effect of 20 percent switched bias in the signals transmitted to the line circuit.

When the signals corresponding to the letters "R" and "Y" with 20 percent switched bias are being transmitted to the line circuit, the reception of a single "break" signal from the line circuit will step the selector switch 2SWA from contacts Nos. 6 to contacts Nos. 7, and will thereby change the switched bias to switched end distortion. The sending of a second "break" signal will return the selector switch brush to its zero position, stopping the transmission of the teletypewriter character test signals.

*Function of a relay corresponding to relay 4C or 5C, each of which is individual to a teletypewriter character signal control circuit*

One selector control circuit is required for a telegraph central office or switching center, one transmitter-distributor circuit is required for the transmitter-distributor (provided that the transmission is at one speed), and one teletypewriter character signal control circuit is required at the telegraph central office for each outlying station connected thereto.

Conductor 403 for signal control circuit 4CCC is connected to key 607 and, likewise, conductor 501 for signal control circuit 5CCC is connected to key 608, both keys being located at the testboard 601 at the telegraph central office. Relays 4R1, 4R2, 4R3 and 4R4 of signal control circuit 4CCC are operated by key 607 whereby grounded source 609 of negative potential of 24 volts is connected to conductor 403. Likewise, relays 5R1, 5R2, 5R3 and 5R4 of signal control circuit 5CCC are operated by key 608 whereby grounded source 609 of negative potential of 24 volts is connected to conductor 501. Each of signal control circuits 4CCC and 5CCC is set up, as will be hereinafter described, to produce the sequence of teletypewriter character test signals required for testing the "SOTUS" unit at the outlying station with which the particular signal control circuit is associated. The connection of source 609 of negative potential of 24 volts to either of conductors 403 or 501 by the operation of its associated key also operates the respective relay of relays 4C, 5C, etc., of signal control circuits 4CCC, 5CCC, etc., and also by connecting source 609 of grounded negative potential to the windings of relays 4R1, 4R2, 4R3, 4R4 or of relays 5R1, 5R2, 5R3, 5R4, or the corresponding relays of any of the other signal control circuits, prepares the particular signal control circuit for responding to the incoming "break" signals, through the selector control circuit which is common to all the signal control circuits.

In the event that relay 4C becomes operated, grounded source 409 of negative potential of 24 volts is connected over No. 2 armature and front contact of the relay to a path extending over conductor 210, and through the windings of the stepping magnets 2STPA and 2STPB of selector switches 2SWA and 2SWB, respectively, to permit the subsequent operation of those stepping magnets.

Also, relay 4C, upon operating, connects at its No. 3 armature and front contact grounded source 409 to a path extending over conductor 405, through the winding of motor control relay 211 of distributor 2TD to start the motor. It also connects the same source 409, over conductor 405, through the winding of start magnet 212 of distributor 2TD to permit the subsequent operation of the start magnet when ground is connected to the other end of the winding of magnet 212 in a path extending over conductor 213, to ground at the front contact and outer lower armature for start relay 3ST, whereby the brush of distributor 2TD is allowed to rotate. Furthermore, relay 4C, when operated, connects at its No. 4 armature and front contact its respective grounded source 401 of positive potential of 130 volts in a path extending over conductor 201, to the inner ring of distributor 2TD, and at its No. 1 armature and front contact closes a path extending over conductor 595 to the plates, in parallel, of vacuum tubes 3B1 and 3B2 to produce 20 percent bias and end distortion.

A summary of the functions of relay 4C or a similar relay, such as relay 5C, is that the relay, upon operating, activates the selector switches 2SWA and 2SWB, it operates motor control relay 211, starts the motor of the distributor 2TD which is to be used for any one of the outlying stations, it activates start magnet 212 of distributor 2TD for operation by the selector control circuit, it connects a source of positive potential to the inner ring of distributor 2TD and it arranges the selector control circuit for bias and end distortion.

The purpose in subjecting the start magnet 212 of distributor 2TD to control by the character signal control circuit relays, such as 4C, along with relay 211, is to ensure that whenever motor control relay 211 of the distributor is released by the release of relay 4C, start magnet 212 will also be released simultaneously, regardless of the condition of the selector control circuit, and the brush of the distributor 2TD will stop on the stop segment. The release of a relay, such as relay 4C, also removes its grounded source, such as source 401, from the inner ring of distributor 2TD. These actions are taken to prevent the rotary brush of the distributor from stopping on a code segment, where it could adversely affect the control of the signal control circuit 4CCC.

*Function of the vacuum tube sending circuit*

When vacuum tube 3B1 is non-conducting, the voltage at its plate is nearly the full voltage of its source, such as source 401, applied through variable resistor 3P1 and fixed resistor 3R23. This positive voltage at the plate of vacuum tube 3B1 is applied through resistor 3R24, to the grid of vacuum tube 3B2, where it overrides the negative voltage applied through resistor 3R25 from source 305 of negative potential of 130 volts, to make vacuum tube 3B2 conducting.

When vacuum tube 3B2 is conducting, the voltage at its plate will be about 30 volts more positive than that at its cathode, or about 6 volts of positive potential relative to ground. This small positive voltage, applied through resistor 3R27 to the grid of vacuum tube 3C1 is insufficient to override the negative voltage applied through resistor 3R28 from grounded source 306 of negative potential and vacuum tube 3C1 accordingly is non-conducting. When vacuum tube 3C1 is non-conducting, the voltage at its plate from grounded source 307 through resistor 3R29 is of a high positive potential. This positive voltage applied through resistor 3R30 to the grid of vacuum tube 3C2 overrides the negative voltage of 130 volts from grounded source 308 through resistor 3R31 and accordingly makes vacuum tube 3C2 conducting.

When vacuum tube 3C2 conducts, current flows from grounded source 309 of a positive potential of 130 volts through resistor 3R32, plate and cathode of vacuum tube 3C2, and the windings, in series, of relay 3SD to ground, the current flowing through the windings of relay 3SD is "marking" in effect, and is approximately double the current flowing through the same windings due to the connection of grounded source 310 of a negative potential of 130 volts, through resistor 3R15, which is "spacing" in effect. The armature of relay 3SD is, therefore, held in engagement with its marking or left-hand contact when vacuum tube 3C2 is conducting. When vacuum tube 3C2 is non-conducting, only the spacing current flowing from grounded source 310, through resistor 3R15, is present in the windings of relay 3SD, and the armature accordingly is operated to its spacing or right-hand contact. The four vacuum tubes 3B1, 3B2, 3C1 and 3C2 are used to permit adding bias and end distortion to the signals, as will be hereinafter described.

In summary, when vacuum tube 3B1 is non-conducting, vacuum tube 3B2 is conducting, vacuum tube 3C1 is non-conducting and vacuum tube 3C2 is conducting, which operates relay 3SD to its marking or left-hand contact. When vacuum tube 3B1 is made conducting, vacuum tube 3B2 becomes non-conducting, vacuum tube 3C1 becomes conducting and vacuum tube 3C2 becomes non-conducting, which operates relay 3SD to its spacing or right-hand contact.

*Production of the first teletypewriter character test signal of the transmitter-start pattern in the teletypewriter character signal control circuit*

The opertaion of a key, such as one of keys 607, 608, etc., at testboard 601 operates the corresponding relay of relays 4C, 5C, etc. As hereinbefore stated, the operation of either the relays 4C or 5C, etc., conditions the corresponding signal control circuit for operation. Assuming that signal control circuit 4CCC, associated with the outlying station where the maintenance man is to test the "SOTUS" unit, is activated by the operation of key 607, relay 4C is accordingly operated. Relay 4C, upon operating, closes at its No. 3 armature and front contact a circuit extending from grounded source 409 of negative potential, conductor 405, the winding of motor start relay 212 which operates to start the motor of distributor 2TD. In response to a single incoming "break" signal, selector switch 2SWA is operated, in a manner which will be described hereinafter, to advance its brushes to its No. 1 contacts on both its front and rear banks. Contact No. 1 on the front bank connects vertical conductor V1 of all the signal control circuits 4CCC, 5CCC, etc. to the grid of vacuum tube 3B1 in a path extending over No. 1 contact and brush of bank No. 1 of stepping switch 2SWC, the brushes of switch 2SWC occupying the positions shown in the idle condition, conductors 205 and 206, contact No. 1 and brush of the front bank of selector switch 2SWA, conductor 207, resistor 2R21, conductor 204 to the vacuum tube grid. Contact No. 1 on the rear bank of switch 2SWA closes an operating circuit for relay 4R1 which operates and prepares bank 4A' of the signal control circuit 4CCC to transmit the teletypewriter signals of the transmitter-start pattern to start the teletypewriter transmitter at the outlying station. The operating circuit for relay 4R1 is traceable from grounded source 609 of negative potential at the operated key 607, conductors 403, 407 and 406, through the winding of relay 4R1, conductor 220, contact No. 1 and brush of the rear bank of selector switch 2SWA, conductor 319, front contact and outer upper armature of start relay 3ST to ground.

Relay 4C, upon being operated at the time that the single "break" signal is received to operate start relay 3ST, closes a circuit from grounded source 409 of negative potential, armature No. 3 and front contact of relay 4C, conductor 405, through the winding of start magnet 212, conductor 213, to ground at the front contact and outer lower armature of start relay 3ST and distributor start magnet 212 operates to start the distributor brush on its first revolution. When the distributor brush rotates over the start segment, grounded source 401 of positive potential is connected to a path extending over conductor 201, inner ring and start segment of distributor 2TD, conductor 202, resistor 2R20, neon lamp 2N1, conductors 203 and 204 to the grid of vacuum tube 3B1. Normally, vacuum tube 3B1 is non-conducting due to the negative voltage from grounded source 301 being connected through resistor 3R22 to the grid of the tube, as hereinbefore described, vacuum tube 3C2 is accordingly conducting, and marking current is flowing in the windings of relay 3SD to operate that relay to its marking or right-hand contact. The connection of the grounded source 401 of a positive potential of 130 volts overrides the negative potential of 130 volts from source 301 and vacuum tube 3B1 starts conducting. When vacuum tube 3B1 becomes conducting, vacuum tube 3C2 becomes non-conducting. With vacuum tube 3C2 non-conducting, "marking" current ceases to flow in the windings of relay 3SD and "spacing" current now flows in the windings of that relay from grounded source 310 of negative potential to operate relay 3SD to its spacing or right-hand conductor.

When the rotating brush of distributor 2TD reaches code segment No. 1, the positive potential from grounded source 401 is connected in a path extending over armature No. 4 and front contact of relay 4C, conductor 201, inner ring, brush and segment No. 1 of distributor 2TD, conductors 2P1 included in dot and dash line 214, front contact and armature No. 1 of relay 4R1, and to all the lamp sockets at the connections of horizontal conductor 4AH1 with vertical conductors V1 to 4V0 of bank 4A'. No socket in any of the signal control circuits is effective to extend a path unless a neon lamp is inserted in such socket and only then at such times as the brush of distributor 2TD is in engagement with the code segment which corresponds to the horizontal conductor with which such socket is associated; for example, a neon lamp in a socket connected to conductors 4AH1 and V1, when the brushes of distributor 2TD engage the No. 1 segment and the brush of bank No. 1 of stepping switch 2SWC engages the No. 1 contact. Conductor 2P1 is also connected to the front contact at armature No. 1 of relays 4R2, 4R3 and 4R4 as well as of each of the four socket bank control relays of each of the other signal control circuits of the system. The other conductors of those designated 2P1 to 2P5, respectively, corresponding to the five selecting pulses of a five-unit code signal, are respectively connected to the front contacts at armatures Nos. 2, 3, 4, and 5, of each of the socket bank control relays in each of the signal control circuits.

Referring now to the selector control circuit, it will be assumed that the rotatable brush of bank No. 1 of stepping switch 2SWC is in engagement with contact No. 1. It will also be assumed that the rotatable brush of the front bank of contacts of selector switch 2SWA is at contact No. 1 where it would actually be if one "break" signal had been received over the line circuit from the outlying station. The rotatable brush of contact bank No. 1 of switch 2SWC is now connected in a path extending over conductor 206, contact No. 1 engaged by the rotatable brush of the front contact bank of switch 2SWA, conductor 207, resistor 2R21, conductor 204, to the grid of vacuum tube 3B1. On contact bank No. 1 of stepping switch 2SWC, the path is extended over vertical conductor V1 which is included in dot and dash line 402, to the lamp sockets at the interconnections of vertical conductor V1 and the respective horizontal conductors in socket banks 4A' of the signal control circuit 4CCC.

Considering the over-all connection which has been approached from both directions namely over horizontal conductor 4AH1 and vertical conductor V1 of the signal control circuit 4CCC, the positive potential of 130 volts from source 401 is applied over segment No. 1 of distributor 2TD, through a neon lamp 4A1–1 inserted in the socket at the inter-connection of vertical conductor V1 and horizontal conductor 4AH1 of signal control circuit 4CCC if the first selecting pulse of the first test signal is to be a "spacing" element. This positive potential of 130 volts is further applied to a path including contact No. 1 and brush of bank No. 1 of stepping switch 2SWC, contact No. 1 and brush of the front bank of selector switch 2SWA and the grid of vacuum tube 3B1, and normally non-conducting vacuum tube 3B1 conducts. Consequently, normally conducting vacuum tube 3C2 becomes non conducting to cause relay 3SD to send a "spacing" pulse to the line circuit.

When the brush of distributor 2TD reaches segment No. 2 the positive potential of 130 volts from source 401 is connected through conductor 2P2 included in the dot and dash line 214, to the front contact and armature No. 2 of bank relay 4R1 of signal control circuit 4CCC to horizontal conductor 4AH2. If no neon lamp is present in the socket at the interconnection of vertical conductor V1 and horizontal conductor 4AH2 of bank 4A', vacuum tube 3B1 will become nonconducting and vacuum tube 3C2 will become conducting to operate relay 3SD to its mark or left-hand contact. A "marking" pulse is therefore sent to the line circuit. If a neon lamp 4A1–2 is present in the lamp socket at the interconnection of vertical conductor V1 and horizontal conductor 4AH2 the positive potential of 130 volts from source 401 will be applied to the grid of vacuum tube 3B1, and vacuum tube 3B1 will remain conducting and relay 3SD will remain in its spacing position to send to the line circuit a "spacing" pulse as selecting pulse No. 2 of the character signal.

As the brush of distributor 2TD passes over segments Nos. 3, 4 and 5, the positive potential of 130 volts from source 401 is connected through the front contacts and armatures Nos. 3, 4 and 5 of bank relay 4R1. Relay 4R1 prepares the connections of conductors 2P3, 2P4, and 2P5 included in dot and dash line 215 over its front contacts and armatures Nos. 3, 4 and 5 to horizontal conductors 4AH3, 4AH4 and 4AH5, respectively. If a neon lamp 4A1–3 is present in the lamp socket at the interconnection of vertical conductor V1 and horizontal conductor 4AH3, the positive potential of 130 volts from source 401 is applied over segment No. 3 of distributor 2TD when the brush passes over such segment, and will therefore be connected to the grid of vacuum tube 3B1. Vacuum tube 3B1 will become conducting, vacuum tube 302 will become non-conducting and relay 3SD will transmit to the line circuit a "spacing" pulse. If no neon lamp is present relay 3SD will transmit to the line circuit a "marking" pulse for pulse No. 3. A similar performance applies to the situation when the brush passes over each of segments Nos. 4 and 5 of the distributor 2TD. In the case of neon lamps 4A1–4 and 4A1–5 being present in the other two sockets, vertical conductor V1 will cause selecting pulses Nos. 4 and 5 of the character signal being sent to the line circuit to be "spacing" pulses and the absence of neon lamps at these intersections causes the corresponding pulses being transmitted to be "marking" pulses. When the brush of the distributor 2TD reaches the stop segment, no connection from this segment to the grid of vacuum tube 3B1 is available. Vacuum tube 3B1 will therefore become non-conducting and vacuum tube 3C2 will become conducting to cause relay 3SD to send to the line circuit a "marking" pulse during the time the distributor brush is in engagement with the stop segment at the end of each character signal. The engagement of the brush with the stop segment of distributor 2TD causes, as hereinbefore mentioned, a positive potential of 130 volts from source 401 to be extended over conductor 216, and resistor 2R35 to the grid of vacuum tube 2D2, and vacuum tube 2D2 conducts to operate relay 2P6 in connection with the production of the "R" and "Y" signals. This connection has no significance at this time, because conductor 232 which extends from the front contact of relay 2P6 terminates at the outer lower armature of relay 3RY which is unoperated at this time, and the noted armature has no connected back contact.

When the brush of distributor 2TD passes over segment No. 5 the positive potential of 130 volts from grounded source 401 is impressed on the circuit extending over conductors 2P5 and 217, resistor 2R23 to the grid of vacuum tube 2D1 and vacuum tube 2D1 becomes conducting to operate relay 2P5′. Relay 2P5′, upon operating, connects at its armature and contact a ground connection to a path extending over conductor 214, armature and back contact of relay 3FH, upper armature and back contact of relay 3RY, conductor 209, through the winding of stepping magnet 2STPC of stepping switch 2SWC, to grounded source 208 of negative potential of 24 volts. Magnet 2STPC operates, but brushes of stepping switch 2SWC do not step until the stepping magnet releases. When the brush of distributor 2TD passes off segment No. 5, vacuum tube 2D1 becomes non-conducting and relay 2P5′ releases. Stepping magnet 2STPC, upon releasing, advances the brushes of switch 2SWC.

Stepping switches of the type represented in FIG. 2 as switch 2SWC frequently have double ended brushes, and the contacts of the switch banks occupy arcs slightly less than 180 degrees, so that as one end of the brush is stepped out of engagement with the last contact of a bank, the other end of the brush advances into engagement with the first contact of the bank. In a full revolution of the brush the contacts of a bank are traversed twice. It is possible to eliminate one of the two arms of each brush so that while certain of the remaining arms are traversing the contacts of the contact banks, the others are traversing the opposite 180-degree arc where there are no contacts. In the switch 2SWC one of the two arms of each brush has been eliminated, and the arrangement is such that the brushes on contact banks 1 and 4 traverse their contact banks concurrently in a half revolution of the brushes, and during the next half revolution the brushes associated with contact banks 2, 4 and 5 traverse those contact banks. Only on bank No. 1 is the connection to contact No. 2 significant at this time, in that it connects the vertical conductor V2 for transmitting to the outlying station the second signal of the transmitter-start pattern.

The distributor brush, upon its next revolution over the start segment, will connect source 401 of positive potential directly through resistor 2R20, neon lamp 2N1, conductors 203 and 204 to the grid of vacuum tube 3B1 which again becomes conducting whereby relay 3SD sends a "spacing" pulse to the line circuit. When the distributor brush arm passes over coded segments Nos. 1 to 5, source 401 of positive potential will be connected successively over conductors 2P1 to 2P5 included in dot and dash line 215, to the front contacts and armatures Nos. 1 to 5, respectively, of relay 4R1 to the lamp sockets connected at the respective interconnections of vertical conductor V2 and horizontal conductors 4AH1 to 4AH5 of the signal control circuit 4CCC. At this time, however, the grid of vacuum tube 3B1 will be connected over the brush on contact No. 1 in the front bank of selector switch 2SWA, conductors 206 and 205 to contact No. 2 on bank No. 1 of stepping switch 2SWC. The effective connection of source 401 of positive potential over distributor segments Nos. 1 to 5 will depend upon the presence of neon lamps in the five sockets bridged between horizontal conductors 4AH1 to 4AH5 and vertical conductor V2 of the signal control circuit. The second character signal to be sent to the line circuit is therefore determined by the presence of neon lamps in one or more of five sockets on vertical conductor V2 in lamp socket bank 4A′, the presence of the lamps determining which of the selecting pulses of the character signal sent to the line circuit are "spacing" elements. At the end of the second character signal stepping magnet 2STPC is again operated and released as hereinbefore described and the brushes of stepping switch 3SWC are stepped in their respective contact banks. When the brush of bank No. 1 is on contact No. 3 of switch 3SWC the next character signal will be determined by the presence of neon lamps in the lamp sockets on vertical conductor V3, not shown, in socket bank 4A′ of the signal control circuit. This action continues as the brushes of the rotary stepping switch 3SWC step over their respective banks, the brush of bank No. 1 successively engaging each of the contacts between contact No. 3 and contact No. 20 on bank No. 1. Each of the contacts from No. 4 to No. 20 of bank No. 1 are connected to vertical conductors V4 to V20, respectively, of the signal control circuit. Vertical conductors V5, V6, V10, V15, V19 and V20 of this group are shown, it being understood that the intermediate vertical conductors are also furnished with their respective lamp sockets at each of the intersections with the horizontal conductors 4AH1 to 4AH5. Contacts Nos. 21 and 22 of bank No. 1 of stepping switch 3SWC are left blank and therefore no vertical conductors are provided in the signal control circuits for these contacts. Accordingly when the brush of bank No. 1 is on either of contacts 21 or 22 the five selecting pulses delivered to the grid of vacuum tube 3B1 during the time the brush of distributor 2TD is rotating over coded segments Nos. 1 to 5, are "marking" to send "marking pulses" corresponding to "Letters" signal, to the line circuit.

Immediately after the brush of stepping switch 2SWC passes off contact No. 22 of bank No. 1 the brush on bank No. 2 engages contact No. 1 of bank No. 2. This contact is connected to vertical conductor No. 21 of the signal control circuits and the character signal sent to the line circuit at this time will, as hereinbefore described, be determined by the neon lamps being present in the lamp sockets on vertical conductor V21 at the intersections of conductors 4AH1 to 4AH5. As the brushes of stepping switch 2SWC continue to step the brush on bank No. 2 reaches its contact No. 20 of bank No. 2 which is connected to vertical conductor V40 of the signal control circuits. Contacts Nos. 21 and 22 of bank No. 2 of the stepping switch 2SWC are also left blank and the "Letters" signals are sent to the line circuit while the brush of switch 2SWC engages each of these contacts. When the brush of stepping switch 2SWC passes off contact No. 22 of bank No. 2, the brush of bank No. 1 reaches contact No. 1 of this bank, and the sending of the sequence of character signals of the transmitter-start pattern is repeated to the line circuit until other "break" signals are received from the outlying station.

In response to two "break" signals from the outlying station, as will be described hereinafter, the brushes of selector switch 2SWA step to their respective No. 2 contacts and an energizing circuit for control relay 4R2 of bank 4B′ is closed and that for control relay 4R1 of bank 4A′ is opened. Relay 4R1 releases and relay 4R2 operates and the five code segments of distributor 2TD then are connected to the vertical conductors V1 to V40 successively in the lamp socket bank 4B′. Therefore, an entirely new set of character signals can be produced by the arrangement of the neon lamps in the lamp socket bank 4B′.

This new set of signals represents the receiver cut-on pattern or a portion thereof for that outlying station which is at the time connected to its signal control circuit 4CCC. Therefore, in response to two "break" signals from the outlying station, relays 4R2, 4R3 and 4R4 are operated in turn, and during the operation of each, the five code segments of distributor 2TD are connected to vertical conductors V1 to V40 successively in their respective lamp socket banks 4B′, 4C′ and 4D′. The circuits for operating relays 4R2, 4R3 and 4R4 will be hereinafter described under "Selector Control Circuit."

DESCRIPTION OF SELECTOR CONTROL CIRCUIT

The selector control circuit permits the selection of the various teletypewriter character test signals by the sending of the "break" signals from the outlying station to the line circuit. The signals obtainable and the number of "break" signals required for each are as follows:

| Type of Signal | Number of Break Signals |
|---|---|
| Transmitter start pattern (socket bank A') | 1. |
| Receiver connect pattern (socket banks B', C' and D'). | 2. |
| Testboard calling-in signal (lamp 612) | 3. |
| Alternate "R" and "Y" signals with plus or minus 20 percent switched bias. | 4. |
| Alternate "R" and "Y" signals with plus or minus 20 percent switched end distortion. | 5, or if switched bias is being received, one additional "break" signal. |

When any signals except the alternate "R" and "Y" signals with 20 percent switched bias are being received, the sending of one "break" signal will stop the transmission from a signal control circuit. When the alternate "R" and "Y" signals with switched bias are being transmitted, the first incoming "break" signal will change the switched bias to switched end distortion, and the next incoming "break" signal will stop the transmission.

Relay 3REC of the selector control circuit is connected in the same manner as relay 3SD on a differential loop repeater basis, the apex of the windings of relay 3REC being connected to the armature of relay 3SD, with one winding of the relay being connected through resistor 3R16 of resistance value of 4000 ohms, to ground, as the biasing winding, and the other winding identified as the line winding, being connected through variable resistor 3P5, and then over the tip conductor 311 to the tip spring of jack 621 at testboard 601 from where it can be patched by means of cord circuit 610 to a line circuit extending to any one of the outlying stations, such as stations 602 and 603. Source 312 of positive potential of 130 volts is connected by means of ring conductor 313 to the ring spring of jack 621 to permit the connection to the jack of a line circuit having no other source of potential and extending to any one of the outlying stations.

Relay 3REC is normally held operated to marking by the loop current in a circuit extending from source 314 to negative potential of 130 volts marking or left-hand contact and armature of relay 3SD, conductor 315, through the upper winding of relay 3REC, resistor 3P5, conductor 311, tip spring in its normal position of jack 621 to source 611 of positive potential of 130 volts at testboard 601. Relay 3REC releases on incoming "break" signals from the outlying station but is not responsive to "spacing" pulses of the outgoing teletypewriter signals because the current through the biasing winding holds it on marking. Relay 3REC operates sufficiently fast to follow the teletypewriter signals incoming over the line circuit. Relay 3REC, in its marking condition, completes a circuit from its grounded armature and marking or left-hand contact, conductor 316, through the winding of slow-release relay 3LS, resistor 3R3, to source 317 of positive potential of 130 volts, and relay 3LS, which is identified herein as the Long Space relay, is normally held operated. When relay 3REC releases due to a "spacing" pulse of a teletypewriter signal incoming over the line circuit, its grounded armature becomes disconnected from the winding of relay 3LS but current continues to flow in the winding of relay 3LS inasmuch as condenser *3c1'* is in a charged condition. When the charge on condenser *3c1'* decreases to a value such that the current flowing is insufficient to hold relay 3LS operated, relay 3LS releases. The time interval of this release is sufficiently great that the longest "spacing" impulse of a teletypewriter signal, such as is had in the "blank" signal, is not sufficient in length to allow relay 3LS to release. Thus in response to incoming teletypewriter signals, relay 3LS remains operated while relay 3REC follows the signals. A "break" signal on the line circuit will be of sufficient duration to allow relay 3LS to release. Relay 3LS, upon releasing, connects ground at its lower armature and back contact, to a circuit extending over the inner lower armature and back contact of start relay 3ST, conductor 304, through the winding of stepping magnet 2STPA, conductor 210, front contact and armature No. 2 of relay 4C which will be in operated condition at the time, to source 409 of negative potential of 24 volts. Stepping magnet 2STPA operates to step the brushes of the front and rear banks of selector switch 2SWA to their respective No. 1 contacts. Selector switch 2SWA, upon operating, opens its off-normal contact 218 to disconnect ground from a circuit extending over conductors 219 and 318, resistor 3R6, condenser *3c2'* to ground, while the ground connected at the upper armature and back contact of relay 3LS is still connected to cendenser *3c2'*.

Relay 3REC, upon reoperating to its marking or normal condition at the end of a "break" signal, reoperates relay 3LS. Relay 3LS, upon operating, disconnects ground at its upper armature and back contact from condenser *3c2'* and this condenser starts to charge in a path extending from grounded source 339 of positive potential of 130 volts, resistor 3R4, conductor 318, resistor 3R6, condenser *3c2'*, to ground whereby condenser *3c2'* is charged with a positive voltage. If no further "break" signals are received from the line circuit, the charge on cendenser *3c2'* becomes sufficient in about 3 seconds to cause cold cathode tube 3A to fire, and relay 3ST operates in an obvious circuit.

Relay 3ST which is identified herein as a start relay, upon operating, (1) closes at its inner upper armature and front contact a locking path for itself, traceable over conductor 333, to ground at the lower contact of off-normal contact 218 of selector switch 3SWA, the brushes of which are now operated to their No. 1 contacts; (2) connects ground on its outer lower armature and front contact to a circuit traceable over conductor 213, through the winding of start magnet 212, conductor 405, front contact and armature No. 3 of any one of relays 4C, 5C, etc., whichever of these relays is operated in response to the operation of its respective selective key of keys 607, 608, etc., then to a grounded source, such as source 409, of negative potential of 24 volts, and start magnet 212 operates to release the brush of distributor 2TD to thereby start rotation of the brush (the motor of distributor 2TD is operating at this time since motor relay 212 was operated when the key controlled relay of relays 4C, 5C, etc., was operated); (3) connects ground at its outer upper armature and front contact in a circuit traceable over conductor 319, brush on its contact No. 1 of the rear bank of selector switch 2SWA, conductor 220 included in dot and dash line 224, through the winding of relay 4R1, conductors 406, 407 and 403, an operated key of keys 607, 608, etc., to grounded source 609 of negative potential of 24 volts at the testboard and assuming that key 607 is operated, relay 4R1 operates; and (4) prepares at its inner lower armature and front contact a path which will close when relay 3LS again releases, the path when closed extending from ground at the lower armature and back contact of relay 3LS, inner lower armature and front contact of relay 3ST, conductor 320, inner lower armature and back contact of relay 3RY, conductor 321, through the winding of release magnet 3RLSA, conductor 210, front contact and armature No. 2 of relay 4C, to source 409 of negative potential of 24 volts. Now any subsequent release of relay 3LS due to a "break" signal will cause release magnet 2RLSA to release whereby the brushes of stepping switch 2SWA return to zero position.

The operation of relay 4R1 connects the circuits from the five-code element segments of the distributor 2TD through conductors 2P1 to 2P5 included in dot and dash line 215 to horizontal conductors 4AH1 to 4AH5, respectively, of lamp socket bank 4A' of signal control circuit 4CCC. Thus the arrangement of neon lamps in the sockets at the interconnections of the horizontal conductors 4AH1 to 4AH5 and vertical conductor V1 of the character signal control circuit will determine the "marking" and "spacing" pulses of a character signal to be sent by relay 3SD to the line circuit.

The ground furnished at the armature and spacing or right-hand contact of relay 3REC at the time that relay is in the spacing condition will hold relay 3ST operated in a circuit traceable over conductor 322, inner upper armature and front contact of relay 3ST, resistor 3R8, through the winding of relay 3ST, resistor 3R9, to grounded source 323 of positive potential of 130 volts. Relay 3ST is, therefore, held operated during a received "break" signal even though the ground from the off-normal contacts 218 has been removed by the return of the brushes of selector switch 2SWA to their zero position. This prevents relay 3ST from releasing and transferring the ground at the armature of relay 3LS back to the winding of stepping magnet 2STPA of selector switch 2SWA, which would cause the selector switch to step again to contact No. 1.

With relay 3ST operated, the sending of teletypewriter signals by relay 3SD will take place, since the start magnet 212 of distributor 2TD is operated, and with relay 4R1 operated, the signals will be derived from the dispositions of neon lamps in the sockets connected to conductors 4AH1 to 4AH5. The teletypewriter character signals produced by the neon lamp arrangements on each of the vertical conductors in lamp socket bank 4A' constitute the testing signals for esing the transmitter start feature of a "SOTUS" unit at the calling-in outlying station. This testing signal material involves a "pause" after the transmission of a "blank" signal which will be about three character signals in duration. This "pause" is obtained as follows: The stepping of the brush to contact No. 1 on the rear bank of switch 2SWA connects ground at the outer upper armature and front contact of relay 3ST to the winding of relay 4R1 as hereinbefore described. From this same contact No. 1 the ground connection at the outer upper armature and front contact of relay 3ST is connected over conductor 220 to the brushes on contact banks Nos. 4 and 5 of stepping switch 2SWC. When the brush of contact bank No. 4 of stepping switch 3SWC passes over contacts Nos. 2 to 4, inclusive, 7 to 9, inclusive, 11, 12 and 16 to 18, inclusive, and also the brush of contact bank No. 5 of the same stepping switch passes over the corresponding contacts of contact bank No. 5, this ground is connected to the junction of resistor 2R20 and neon lamp 2N1. When this ground is so connected, the source 401 of positive potential of 130 volts, which is normally connected to the grid of vacuum tube 3B1 during the time the brush of distributor 2TD is at the start segment, is shunted out and neon lamp 2N1 does not fire, so that vacuum tube 3B1 remains cut off and no "space" pulse is transmitted at this time. If in lamp socket bank 4A' no lamps are provided for the character signal to be sent at the time corresponding to engagement of brushes of contact banks Nos. 4 and 5 of stepping switch 2SWC with each of the above enumerated contacts of their respective banks, no "spacing" pulses at all will be sent to the line circuit, and a continuous marking "pause" will occur on the line circuit for the duration of the character signal. Therefore, after three or four consecutive intervals transpire in this manner during which the brushes of stepping switch 2SWC are passing over the noted contacts of contact banks Nos. 4 and 5, and no lamps are provided in the lamp sockets associated with the vertical conductors V1 to V40 served in the corresponding contacts of contact banks Nos. 1 and 2, a steady marking pause of three or four character signals in duration will be produced.

Vertical conductors V1 to V40, considered now with respect to lamp socket bank 4A' only, are associated with contacts Nos. 1 to 20 of contact bank No. 4 and contacts Nos. 1 to 20 on contact bank No. 5 of stepping switch 2SWC, and are arranged for characters as follows:

| Vertical Lamp Socket Conductors | Contacts on Banks Nos. 4 and 5 of Switch 2SWC | Character Signals |
|---|---|---|
| V1 and V21 | Contacts No. 1 and No. 1. | "Blank" (lamps in socket positions 4AH1 to 4AH5, inclusive). |
| V2 to V4 and V22 to V24. | Contacts Nos. 2 to 4 and Nos. 2 to 4. | No lamps (pause). |
| V5 and V25 | Contacts No. 5 and No. 5. | "Space" (lamps in socket positions 4AH1, 4AH2, 4AH3 and 4AH5). |
| V6 and V26 | Contacts No. 6 and No. 6. | "H" (non-valid code signal) (lamps in socket positions 4AH1, 4AH2, 4AH3 and 4AH5). |
| V7 to V9 and V27 to V29. | Contacts Nos. 7 to 9 and Nos. 7 to 9. | No lamps (pause). |
| V10 and V30 | Contacts No. 10 and No. 10. | Valid code signal. |
| V11, V12 and V31, V32 | Contacts Nos. 11 and 12 and Nos. 11 and 12. | Pause. |
| V13 and V14 and V33 and V34. | Contacts Nos. 13 and 14 and Nos. 13 and 14. | No lamps (letters). |
| V15 and V35 | Contacts No. 15 and No. 15. | "Blank" (lamps in socket positions 4AH1 to 4AH5, inclusive). |
| V16 to V18 and V36 to V38. | Contacts Nos. 16, 17 and 18 and Nos. 16, 17 and 18. | No lamps (pause). |
| V19 and V39 | Contacts No. 19 and No. 19. | "X" (stop code) (lamps in socket 4AH2). |
| V20 and V40 | Contacts No. 20 and No. 20. | "Letters" (no lamps). |

*Note.*—Contacts Nos. 21 and 22 in each of banks Nos. 4 and 5 of stepping switch 2SWC are not connected to the neon lamp sockets and, accordingly, the "Letters" signal will be sent when the brushes of stepping switch 2SWC are on contacts Nos. 21 and 22 of banks Nos. 4 and 5.

When the brush of stepping switch 2SWC is on contact No. 14 or 22 of either bank No. 4 or 5, the ground on the brush is connected to the winding of release magnet 2RLSA of selector switch 2SWA and release magnet 2RLSA operates to reset the brushes of that selector switch to normal and stop the transmission of teletypewriter test signals. Thus after each teletypewriter signal combination of a non-valid and valid transmitter start pattern and after the stop code signal has been sent, the transmission of teletypewriter test signals will stop. When it is desired that the transmission of teletypewriter signals resume, they are restarted by again sending one "break" signal. It will be apparent that a test should not be ended with the brush of either bank No. 4 or 5 of switch 2SWC engaging contact No. 14. A break signal should be transmitted which will effect transmission of the stop code signal and completion of the stepping switch cycle.

*Receiver cut-on teletypewriter character test signals*

The receiver cut-on teletypewriter character test signal combinations are obtained by sending from the outlying station two "break" signals over the line circuit. These "break" signals step the brushes of stepping switch 2SWA, as hereinbefore described, to contact No. 2, and approximately 3 seconds after the end of the second "break" signal, cold cathode tube 3A fires to operate relay 3ST. Relay 3ST, upon operating, closes the operating circuit for start magnet 212 of distributor 2TD and the brush of distributor 2TD again starts to rotate for another series of revolutions as hereinbefore described.

When the brush on the front bank of selector switch 2SWA steps to contact No. 2, the connection is the same as when the brush was on contact No. 1, which connects the grid of vacuum tube 3B1 to the brushes on contact banks Nos. 1 and 2 of stepping switch 2SWC and the grid of vacuum tube 3B1 receives the pulses of the coded signals from the lamp socket banks 4B', 4C', and 4D', in turn, through contact banks Nos. 1 and 2 successively of stepping switch 2SWC, conductor 206, contact No. 2 of the front contact bank and brush of selector switch 2SWA, conductor 207, resistor 2R21, conductor 204, to the grid of vacuum tube 3B1.

The operation of relays 4R2, 4R3 and 4R4, as hereinbefore stated, will now be described in detail. When the brush of the rear contact bank of selector switch 2SWA is on contact No. 2, ground at the outer upper armature and front contact of relay 3ST is connected over conductor 319, brush and contact No. 2 of the rear contact bank of selector switch 2SWA, to the brush of contact bank No. 3 of stepping switch 2SWC, and this ground is also connected over conductor 225, through the off-normal contact 226 of stepping switch 2SWB in its normal position, to conductor 221 included in dot and dash line 224, through the winding of relay 4R2, conductors 406 and 407 and conductor 403 through key 607 in operated condition to grounded source 609 of negative potential of 24 volts and relay 4R2 operates. Relay 4R2, upon operating, connects the five code or selecting segments of distributor 2TD to lamp socket bank 4B'. The teletypewriter character signals transmitted from lamp socket bank 4B' at this time will, therefore, be determined by the arrangement of the neon lamps in the sockets of bank 4B. When all the signals determined by the lamp arrangement on each of the vertical conductors V1 to V40 of lamp socket bank 4B have been transmitted, each signal causing stepping magnet 2STPC to operate and release, the brush of bank No. 3 has been stepped around through an angular distance of approximately 360 degrees and is then in engagement with its contact No. 22.

When the brush of contact bank No. 3 of stepping switch 2SWC reaches contact No. 22, it closes a circuit extending from the ground on conductor 319 over the brush and rear bank contact 2 of stepping switch 2SWA, over conductor 227, through the winding of stepping magnet 2STPB, conductor 210, front contact and armature No. 2 of relay 4C, to grounded source 409 of negative potential of 24 volts. Stepping magnet 2STPB operates, and the brush of selector switch 2SWB now takes its first step to contact No. 1. When the brush arm of selector switch 2SWB reaches contact No. 1, the operating circuit of relay 4R2 is opened at off-normal contact 226 and relay 4R2 releases. At contact No. 1 of selector switch 2SWB, a new circuit is closed from conductor 225 extending over conductor 222 included in dot and dash line 224, through the winding of relay 4R3, conductors 406, 407 and 403, through the operated key 607, to ground source 609 of negative potential of 24 volts and relay 4R3 operates. Relay 4R3, upon operating, connects the five code segments of distributor 2TD to lamp socket bank 4C'. The teletypewriter character signals transmitted through lamp socket bank 4C' to the outlying station will now be determined by the arrangement of the neon lamps in each of vertical conductors V1 to V40, in turn, of lamp socket bank No. 4C'.

When the brush on contact bank No. 3 of stepping switch 2SWC again reaches contact No. 22, it connects ground again to the winding of stepping magnet 2STPB of selector switch 2SWB causing the brush of switch 2SWB to step to contact No. 2. This removes the ground from the operating circuit of relay 4R3 which releases and with brush on contact No. 2 of selector switch 2SWB, a circuit is closed over conductor 223 included in dot and dash line 224, through the winding of relay 4R4, conductors 407 and 403, the operated key 607, to grounded source 609 of negative potential of 24 volts and relay 4R4 operates. Relay 4R4, upon operating, connects the five code segments of distributor 2TD to lamp socket bank 4D'. The teletypewriter character signals sent at this time from lamp socket bank 4D to the outlying station will now be determined by the arrangement of the neon lamps of lamp socket bank 4D'.

When the brush on contact bank No. 3 of stepping switch 2SWC reaches contact No. 22 the next time, it will operate stepping magnet 2STPB whereby the brush of selector switch 2SWB is stepped to contact No. 3 where the ground is connected to the winding of release magnet 2RLSB which operates to restore the brush of selector switch 2SWB to normal. The brush of selector switch 2SWB upon being restored to normal, that is to its zero position, removes ground from the operating circuit for relay 4R4 thereby releasing the relay. Thus the teletypewriter character signal transmitting circuit is capable of sending a total of 120 character signals determined by the three lamp socket banks 4B', 4C' and 4D'. When the brush of selector switch 2SWB is restored to normal, grounded conductor 319 is again connected over the brush and No. 2 contact of the rear bank of selector switch 2SWA, conductor 225, off-normal contacts 226, conductor 221 included in dot and dash line 224, through the winding of relay 4R2, conductors 4P1, 407 and 403, operated key 607, to the grounded source 609 of negative potential of 24 volts and relay 4R2 again operates. The teletypewriter character signals are again transmitted to the outlying station as determined by the neon lamps in lamp socket bank 4B'. In this manner the teletypewriter character test signals of the receiver cut-on code are repeated to the outlying station. The sending of the signals of the receiver cut-on pattern will continue until a "break" signal is transmitted from the outlying station which will reset the brush of selector switch 2SWA to its normal or zero position and stop the transmission of teletypewriter signals.

*Operation of testboard calling-in signal*

The testboard calling-in signal is operated by sending three "break" signals. These signals step the brushes of selector switch 2SWA to their respective contacts No. 3. With the subsequent operation of relay 3ST as hereinbefore described, the ground connected at the outer upper armature and front contact of relay 3ST is extended over conductor 319, brush in engagement with contact No. 3 on the rear contact bank of selector switch 2SWA, conductor 228, through lamp 612, to grounded source 613 of negative potential of 130 volts and the calling-in signal lamp 612 at the testboard operates to indicate to the attendant at the testboard that he is wanted in a telephone connection with the maintenance man at the outlying station. The attendant at the testboard upon observing the lighting of calling-in signal lamp removes the patching cord from jacks 621 and 616 and inserts plug 614 of his telephone headset 615 into jack 616 and is now in telephonic communication with the maintenance man at the outlying station whereat the maintenance man after sending the three "break" signals to operate the calling-in signal lamp inserts plug 617 of his set 619 into jack 618. The maintenance man's telephone set 619 is now connected through to the telephone headset of the attendant at the testboard. The transmission of a "break" signal by either the maintenance man or the attendant at the testboard will restore selector switch 2SWA to its normal position. The restoring circuit is traceable from grounded source 409 of negative potential of 24 volts, armature No. 2 and front contact of relay 4C, conductor 210, through the winding of release magnet 2RLSA, conductor 321, back contact and inner lower armature of relay 3RY, conductor 320, front contact and inner lower armature of relay 3ST, to ground at the back contact and lower armature of relay 3LS.

*Production of alternate "R" and "Y" signals*

"Figures," "H" and then alternate "R" and "Y" signals with 20 percent switched bias are obtained by sending four "break" signals from the outlying station to the line circuit. The four "break" signals step the brushes on selector switch 2SWA to their contacts No. 4, where-upon relay 3ST operates as hereinbefore described. With the brush of the front contact bank of selector switch 2SWA on contact No. 4, the grid of vacuum tube 3B1 is connected over conductor 229, through neon lamp 2N10, conductor 2P3, to code segment No. 3 of distributor 2TD. With this connection, only selecting pulse No. 3 will be "spacing" when the brush rotates over distributor 2TD to send the teletypewriter character signal for "Figures" to the line circuit. With the brushes of selector switch 2SWA on their contacts No. 4 the brush of the rear contact bank connects grounded conductor 319 to a path traceable over conductor 230, through the winding of "Figures H" relay 3FH, resistor 3R10, to grounded source 324 of positive potential of 130 volts, thereby operating relay 3FH. Relay 3FH, upon operating, transfers at its armature, conductor 214 to a path extending over conductor 304, through the winding of stepping magnet 2STPA, conductor 210, front contact and armature No. 2 of relay 4C, to grounded source 409 of negative potential of 24 volts. Conductor 214 extends in the opposite direction to the front contact of relay 2P5′. Relay 2P5′ operates in response to the selecting pulse received from code segment No. 5 of distributor 2TD and thereby during the operation of relay 2P5′ connects ground momentarily to operate stepping magnet 2STPA. Therefore, at the beginning of selecting pulse No. 5 stepping magnet 2STPA operates to step the brushes of selector switch 2SWA to their respective contacts No. 5.

With the brush of the front contact bank of selector switch 2SWA at its contact No. 5 the grid of vacuum tube 3B1 is connected in a circuit traceable over circuit 204, resistor 2R21, conductor 207, brush on contact No. 5 of selector switch 2SWA, through neon lamps 2N7, 2N8 and 2N9, in parallel, and over their respectively associated conductors 2P1, 2P2 and 2P4 to the code segments Nos. 1, 2 and 4 and inner ring of distributor 2TD, conductor 201, front contact and armature No. 4 of relay 4C, to grounded source 401 of positive potential. When the brush of the distributor 2TD rotates over segments Nos. 1, 2 and 4 the corresponding pulses will be transmitted to the line circuit as "spacing" elements of the character signal "H." The fifth selecting pulse of the character signal "H," operates relay 2P5 which upon operating, will step the brushes of selector switch 2SWA to their respective contacts No. 6.

The stepping of the brush on the rear contact bank of selector switch 2SWA to contact No. 6 causes the release of relay 3FH but condenser 3c4′ has stored a charge which delays the release of the relay sufficiently so that a positive operation of the stepping magnet 2STPA occurs before the circuit to the stepping magnet 2STPA is opened. The same brush of selector switch 2SWA on its contact No. 6 closes a circuit from grounded conductor 319 extending over conductor 231, through the winding of relay 3RY, resistor 3R11, to grounded source 325 of positive potential of 130 volts and relay 3RY operates.

Relay 3RY upon operating, opens at its upper armature and back contact the operating circuit of stepping magnet 2STPC of stepping switch 2SWC so that the stepping switch does not operate during the sending of alternate "R" and "Y" signals. Also, relay 3RY upon operating, transfers its inner lower armature from its back contact, where it opens the operating circuit for release magnet 2RLSA, to its front contact, where it closes a path extending over conductor 304, through the winding of stepping magnet 2STPA, conductor 210, front contact and armature No. 2 of relay 4C, to grounded source 409 of positive potential. Stepping magnet 2STPA operates to step the brushes of selector switch 2SWA to their respective contacts No. 7. This is for the purpose of making it easy to change the signals from the alternate "R" and "Y" signals with 20 percent switched bias to alternate "R" and "Y" signals with 20 percent switched end distortion which will be hereinafter described.

The stepping of the brush of the front contact bank of selector switch 2SWA to contact No. 6 connects the grid of vacuum tube 3B1 to the upper armature of relay 3R. When relay 3R is in its released position the grid of vacuum tube 3B1 is therefore connected over conductor 334, upper armature and back contact of relay 3R, conductor 326, through neon lamps 2N5 and 2N6, in parallel, their respective conductors 2P2 and 2P4 and the code segments Nos. 2 and 4 of distributor 2TD, to transmit to the line circuit a "Y" signal comprising "spacing" elements for pulses Nos. 2 and 4 and "marking" elements for pulses Nos. 1, 3 and 5. When relay 3R is in its operated condition the grid of vacuum tube 3B1 is connected over conductor 327, through neon lamps 2N2, 2N3 and 2N5 in parallel, to the respective conductors 2P1, 2P3 and 2P5 and the code segments Nos. 1, 3 and 5 of distributor 2TD to transmit to the line circuit an "R" signal comprising "spacing" elements for pulses Nos. 1, 3 and 5 and "marking" elements for pulses Nos. 2 and 4. Thus if relay 3R is arranged to alternately operate on one character signal and to release on the next, a succession of alternate "R" and "Y" signals will be transmitted to the line circuit.

Relay 3RY upon operating, also prepares, for closure during the time that the brush of distributor 2TD is on its stop segment, a path extending from ground at the armature and front contact of relay 2P6, conductor 232, outer lower armature and front contact of relay 3RY, conductor 329, to the path comprising relays 3R and 3Y, during the stop pulse of each character signal transmitted at this time to the line circuit. When the ground at the armature and front contact of relay 2P6, as applied to the path comprising relays 3R and 3Y, is applied through the break contacts controlled by the lower armature to the winding of relay 3R, relay 3R operates and locks to ground at its inner lower armature and front contact. No operation of relay 3Y can occur at this time because the ground pulse applied to the path comprising relays 3R and 3Y is connected through the lower armature and back contact of relay 3Y, resistor 3R2, to grounded source 328 of positive potential of 130 volts whereby the winding of relay 3Y is shunted. At the end of the stop pulse of the signal transmitted to the line circuit, when relay 2P6 releases, ground is removed at the armature and front contact of relay 2P6 in the circuit traceable over conductor 232, outer lower armature and contact of relay 3RY, conductor 329, to the path comprising relays 3R and 3Y and relay 3Y will operate in a path traceable from grounded source 328 of positive potential of 130 volts, resistor 3R2, through the winding of relay 3Y, front contact and inner lower armature of relay 3R to ground. Both relays 3R and 3Y are now operated. The character signal sent while relay 3R was unoperated was a "Y" signal. With relay 3R now operated the next character signal will be an "R" signal. At the end of this character signal the ground pulse applied to the path comprising relays 3R and 3Y by the operation of relay 2P6 will be connected over the inner lower armature and front contact of relay 3Y, resistor 3R1, to grounded source 328 of positive potential and the winding of relay 3R is thereby shunted and relay 3R releases. Relay 3Y will remain operated due to the fact that the ground pulse received over conductor 329 is now applied over the make-before-break contacts of relay 3R, through the winding of relay 3Y, resistor 3R2, to grounded source 328 of grounded positive potential. The removal of the ground pulse on conductor 329 at the end of stop pulse of the "R" character signal will cause the release of relay 3Y and both relays will now be released. With relay 3R now released, the character signal sent to the line circuit will be a "Y" signal. The circuit comprising relays 3R and 3Y continues to operate as just described, one operation of relay 2P6 connecting a ground pulse to the circuit to operate relay 3R at the beginning of the pulse and relay 3Y at the end of the pulse. The ground pulse applied during the next character signal releases relay 3R at the beginning of the pulse and releases relay 3Y at the end of the pulse. Thus relay 3R causes "R" and "Y" signals to be alternately transmitted to the line circuit.

*Operation of switched bias and switched end distortion circuit*

The transition delay required to produce bias or end distortion is had in response to the operation and release of relay 3R by connecting condenser 3*c*7′ associated with relay 3ED to the plate of either vacuum tube 3B1 or 3B2, where it delays the operation of relay 3SD either from "marking" to "spacing" or from "spacing" to "marking." Switched bias is obtained by switching the condenser from vacuum tube 3B1 to 3B2 during the stop pulse of each character signal transmitted to the line circuit, while switched end distortion is obtained by switching the condenser from one vacuum tube to the other during the start pulse of each character signal. A detailed description of this operation is as follows: When relay 3ED is released the circuit will produce switched bias and when it is operated, switched end distortion will result. When relay 3ED is released, condenser 3*c*7′ is connected in a path traceable over the left-hand armature and back contact of relay 3ED, outer lower armature and back contact of relay 3R, conductor 330, to the plate of vacuum tube 3B1. Vacuum tube 3B1 is non-conducting during a marking pulse and while it is in this condition condenser 3*c*7′ is charged to a positive potential of nearly 130 volts in a path traceable from grounded source 401 of positive potential, armature No. 1 and front contact of relay 4C, conductor 505, variable resistor 3P1, resistor 3R23, conductor 330, back contact and outer lower armature of relay 3R, back contact and left-hand armature of relay 3ED, condenser 3*c*7′, to ground. When vacuum tube 3B1 becomes conducting due to a positive voltage received at its grid, condenser 3*c*7′ discharges through the relatively low impedance of vacuum tube 3B1 during its conducting interval and very little delay in the "marking-to-spacing" transition of relay 3SD occurs. When the positive voltage is removed from the grid of vacuum tube 3B1 and it becomes non-conducting, condenser 3*c*7′ charges to a positive potential at a rate determined by the resistance in the plate circuit of vacuum tube 3B1. This resistance is determined by the setting of variable resistor 3P1. The time required for condenser 3*c*7′ to become charged to a potential sufficient to cause the following vacuum tube 3B2 to conduct again, is the time interval by which the operation of relay 3SD from "spacing" back to "marking" is delayed. This time interval is thus a measure of the "spacing" bias produced in the signals by the delay in the "spacing-to-marking" transition. The connection of condenser 3*c*7′ to the plate of vacuum tube 3B1 takes place when relay 3R is released, under which condition a "Y" signal is sent to the line circuit. Therefore a "Y" signal is sent with the "spacing" bias. When relay 3R is operated to cause the sending of an "R" signal, the operation of its outer lower armature to its front contact transfers condenser 3*c*7′ to the plate of vacuum tube 3B2. Vacuum tube 3B2 is conducting for "marking" and non-conducting for "spacing." During a "spacing-to-marking" transition, vacuum tube 3B2 goes from non-conducting to conducting, and condenser 3*c*7′ discharges through vacuum tube 3B2, causing no delay in the transition. During a "marking-to-spacing" transition vacuum tube 3B2 goes from conducting to non-conducting condition. At this time condenser 3*c*7′ charges slowly to a positive potential at a rate determined by the resistance at which the variable resistor 3P3 is set. The "marking-to-spacing" transition is thus delayed. A delay in the "marking-to-spacing" transitions has the same relative effect on the elements of a teletypewriter character signal as an advance in the "spacing-to-marking" transitions, and accordingly produces "marking" bias. The connection of condenser 3*c*7′ to the plate of vacuum tube 3B2 therefore applies "marking" bias to the signals transmitted to the line circuit. The signals corresponding to the letter "R" are therefore subjected to "marking" bias while the signals corresponding to the letter "Y" is biased to "spacing."

The summary of the operation of the biasing circuit is that as relay 3R operates and releases to cause sending of, first, an "R" signal and then a "Y" signal, condenser 3*c*7′ is transferred back and forth between the plates of vacuum tubes 3B1 and 3B2, applying "spacing" bias to the "Y" signal when the condenser is connected to the plate of vacuum tube 3B1, and "marking" bias to the "R" signal when it is connected to the plate of vacuum tube 3B2. It should be noted that relay 3R operates at the beginning of the stop pulse of a character signal transmitted to the line circuit, and therefore the distortion caused by condenser 3*c*7′ is bias rather than end distortion.

When it is desired to send switched end distortion, a "break" signal is sent from the outlying station to the line circuit usually at the time switched bias signals are being received from the central office. Under these circumstances, the ground on the lower armature and back contact of relay 3LS is connected over the inner lower armature and front contact of relay 3ST, inner lower armature and front contact of relay 3RY, to the stepping magnet 2STPA which operates to step the brushes of selector switch 2SWA from their respective contacts No. 6 to their respective contacts No. 7. When the brush on the rear contact bank of selector switch 2SWA reaches contact No. 7 relay 3ED operates in a path traceable from grounded source 331 through resistor 3R12, winding of relay 3ED, conductor 332, contact No. 7 and brush of the rear contact bank of selector switch 2SWA, conductor 319, front contact and outer upper armature of relay 3ST, to ground. Relay 3ED operates and upon operating, closes a circuit at its right-hand armature and front contact, through the winding of relay 3RY, resistor 3R11, to grounded source 325 of positive potential of 130 volts, and relay 3RY, having started to release when the brush of the rear contact bank of selector switch leaves contact No. 6, reoperates. Also relay 3ED, upon operating, transfers at its left-hand armature, the condenser 3*c*7′ from the outer lower armature of relay 3R to the outer lower armature of relay 3Y. When relay 3Y is not operated, condenser 3*c*7′ is connected to the plate of vacuum tube 3B1 as it was before, and when relay 3Y is operated condenser 3*c*7′ is connected to the plate of vacuum tube 3B2 also as before. The difference between the connection of condenser 3*c*7′ to relay 3Y rather than to relay 3R is that relay 3Y operates at the end of a stop pulse of a character signal transmitted to the line circuit which makes its effect felt during the start pulse of the following character signal. The switching of condenser 3*c*7′ from the plate of vacuum tube 3B1 to the plate of vacuum tube 3B2 therefore occurs during the start pulse of a character signal, and end distortion rather than bias is produced. The amount of end distortion should be the same as the amount of bias that was produced since both are produced by the same values of resistance in the plate circuits of vacuum tubes 3B1 and 3B2 and by the same value of capacitance in condenser 3*c*7′.

When it is desired to stop the transmission of "R" and "Y" signals subjected to switched end distortion, the sending of a "break" signal from the outlying station will cause selector switch 3SWA to step its brushes to their respective contacts No. 8. This will cause the release of relay 3ED which in turn will cause the release of relay 3RY. The ground from the lower armature of relay 3LS will therefore now be connected to the winding of the release magnet 2RLSA in a path traceable from grounded source 409 of negative potential of 24 volts, armature No. 2 and front contact of relay 4C, conductor 210, through the winding of release magnet 2RLSA, conductor 321, back contact and inner lower armature of relay 3RY, conductor 320, front contact and inner lower armature of relay 3ST, to ground at the back contact and lower armature of relay 3LS. Release magnet 2RLSA operates and restores stepping switch 2SWA to its normal, or zero, position to stop the transmission of teletypewriter signals to the line circuit.

It will be noted that with relays 3R, 3Y, 3RY and 3ED released, which is the normal condition, the condenser **3*c*7′ is connected through the left-hand armature and back contact of relay 3ED and the outer lower armature and back contact of relay 3R to the plate of tube 3B1. As described above, condenser 3*c*7′, so connected, imposes spacing bias on signals impressed on the grid of tube 3B1. Relay 3R and 3ED are released during the transmission of the transmitter start signal patterns that are selected for transmission under the control of relays 4R1 and 5R1, and during the transmission of station connecting codes when any of the relays 4R2, 4R3, 4R4, 5R2, 5R3 or 5R4 is operated. Thus those signals are subjected to spacing bias and, as previously set forth, the magnitude of the spacing bias is of the order of 20 percent of a signal element. The "SOTUS" units that receive the test signals are capable, when in proper operating condition, of correctly interpreting received signals having bias exceeding 20 percent. Accordingly, there should be no false selections when the "SOTUS" units are responding to signals so biased, and any unit that fails to respond properly to the signals is faulty and requires servicing. If it should be desired to eliminate the spacing bias except when the "R" and "Y" signals are transmitted, this may be accomplished by having condenser 3*c*7′** normally disconnected from the left-hand armature of relay 3ED by suitable relay contacts.

Upon completion of the checking operation of the "SOTUS" unit at the outlying station, the maintenance man thereat sends three break signals to light calling-in lamp 612 at the testboard at the central office. The attendant will, upon observing the lighted lamp, connect telephone headset 615 to the line circuit for communicating with the maintenance man. Upon receiving information to the effect that the checking operation at the outlying station is completed, the testboard attendant restores the operated key 607, whereby the system at the central office is restored to normal.

What is claimed is:

1. In a telegraph system, a switching center, a station, a line circuit interconnecting said switching center and said station, means at said station for transmitting a non-code control signal over said line circuit, a telegraph signal responsive selector mechanism at said station, a source of telegraph signals at said switching center and means at said switching center responsive to one or more of said control signals incoming over said line circuit for selecting in accordance with the number of control signals received, a desired group of telegraph signals to be transmitted from said source for testing said selector mechanism.

2. In a telegraph system, a switching center, a station, a line circuit interconnecting said switching center and said station, means at said station for sending a non-code control signal over said line circuit, a telegraph signal responsive selector mechanism at said station, a plurality of sources of different groups of telegraph signals at said switching center, means at said switching center responsive to a single transmission of said control signal incoming over said line circuit for selecting a desired group of telegraph signals from one of said sources for testing one of the selective characteristics of said selector mechanism, other means at said switching center responsive to additional transmissions of said control signal incoming over said line circuit for selecting another desired group of telegraph signals from another of said sources to test another of the selective characteristics of said selector mechanism, and still other means at said switching center responsive to other additional transmissions of said control signal incoming over said line circuit for transmitting to said line circuit telegraph signals with various types of distortion.

3. In a telegraph system, a switching center, a station, a line circuit interconnecting said switching center and said station, a manually operable element at said station for transmitting "break" signals over said line circuit, a signal responsive selector mechanism at said station, sources of telegraph signals at said switching center, means at said switching center responsive to one or more "break" signals incoming over said line circuit for selecting in accordance with the number of "break" signals received a desired group of telegraph signals from one or another of said sources for accordingly testing the selecting characteristics of said selector mechanism, and other means responsive to the operation of said "break" signal responsive means for causing said break signal responsive means to be restored to its normal condition in response to an additional one or more "break" signals incoming over said line circuit after a predetermined interval of time following the operation of said break signal responsive means.

4. In a teletypewriter intercommunicating system, a switching center, a plurality of outlying stations, line circuits respectively connecting said outlying stations to said switching center, a teletypewriter receiver at each of said stations, and means at each of said stations for transmitting "break" signals to said switching center, said switching center comprising signal producing means, means responsive to said "break" signals for selecting a group of signals from said signal producing means, and signal transmitting means for automatically transmitting, in turn, from each of said selected groups to test the teletypewriter receiver the outlying station in response to said "break" signals.

5. In a telegraph system, a switching center, a station, a line circuit interconnecting said switching center and said station, means at said station for sending "break" signals over said line circuit, a telegraph receiver at said station, a source of telegraph signals arranged to produce signals in groups of various patterns, a testboard calling-in signal at said switching center, means at said switching center responsive (1) to a certain number of "break" signals incoming over said line circuit for selecting the desired pattern of a plurality of groups of signals from said source for effectively testing a particular characteristic of said receiver, (2) to another number of "break" signals for selecting the desired pattern for another plurality of a group of signals from said source for effectively testing another characteristic of said receiver, and (3) to still another number of "break" signals for operating said calling-in signal to attract the attention of an attendant at said switching center.

6. In a telegraph system, a switching center, a plurality of stations, line circuits respectively connecting said stations to said switching center, telegraph receivers at said stations, means at each of said stations for transmitting "break" signals over the respective line circuit, a source of telegraph signals at said switching center, rotatably operable means at said switching center responsive to one "break" signal incoming over any one of said line circuits for selecting from said source a group of signals for testing a particular characteristic of said telegraph receivers, rotatably stepping means arranged to operate one step in response to the transmission of each of the signals from said source during the time that the rotatably operable means is in its first operated position, and means for repeating the transmission of said signals from said source as long as said rotatably operable means remains in its first operated position.

7. In a teletypewriter system, a switching center, a plurality of stations, line circuits respectively connecting said stations to said switching center, means at each of said stations for transmitting "break" signals over the respective line circuit, a teletypewriter receiver connected to each of said line circuits, a source of teletypewriter signals having switched bias, rotatably operable means at said switching center responsive to "break" signals incoming over any one of said line circuits, automatically operating means including space discharge means controlled by said rotatably operable means in a certain one of its operated positions for transmitting to said line circuit a "Figures" signal and for automatically operating said rotatably operable means to its next operated position, other space discharge means cooperating with said automatically operating means controlled by said rotatably operable means in said next operated position for transmitting to said one line circuit a signal for the letter "H" and for automatically operating said rotatably operable means to another of its operated positions, still other space discharge means cooperating with said automatically operating means and controlled by said rotatably operated means in said other operated position for transmitting signals of the letter "R" and "Y" alternately, delay circuit means cooperating with said automatically operating means and responsive during the production of said alternate signals for impressing a marking bias of a predetermined amount on each of the "R" signals and a spacing bias of the same amount on each of the "Y" signals.

8. In a teletypewriter system according to claim 7 wherein said rotatably operable means includes electromagnetic means responsive to an additional "break" signal incoming over said line circuit and cooperating with said delay means for impressing marking end distortion of said predetermined amount on each of the "R" signals and spacing end distortion of the same amount on each of the "Y" signals.

No references cited.